(12) United States Patent
McCloud et al.

(10) Patent No.: US 11,860,435 B2
(45) Date of Patent: Jan. 2, 2024

(54) FIBER OPTIC PIGTAIL ASSEMBLY

(71) Applicant: Leviton Manufacturing Co., Inc., Melville, NY (US)

(72) Inventors: Sean McCloud, Melville, NY (US); Tony Yuen, Melville, NY (US); Jamie Leonard, Melville, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 17/493,197

(22) Filed: Oct. 4, 2021

(65) Prior Publication Data

US 2022/0026657 A1 Jan. 27, 2022

Related U.S. Application Data

(63) Continuation of application No. 16/868,732, filed on May 7, 2020, now Pat. No. 11,150,431, which is a continuation of application No. 16/221,061, filed on Dec. 14, 2018, now Pat. No. 10,663,687.

(51) Int. Cl.
*G02B 6/44* (2006.01)

(52) U.S. Cl.
CPC ......... *G02B 6/4471* (2013.01); *G02B 6/4454* (2013.01)

(58) Field of Classification Search
None
See application file for complete search history.

(56) References Cited

U.S. PATENT DOCUMENTS

| | | | | |
|---|---|---|---|---|
| 2002/0164133 A1* | 11/2002 | Rattazzi | ............... | G02B 6/4482 385/100 |
| 2012/0301083 A1* | 11/2012 | Carter | .................. | G02B 6/4471 211/13.1 |
| 2013/0034330 A1* | 2/2013 | Barron | ................. | G02B 6/4454 385/95 |
| 2017/0363832 A1* | 12/2017 | Mullaney | ............. | G02B 6/4471 |

FOREIGN PATENT DOCUMENTS

EP 1361465 A1 * 11/2003 ........... G02B 6/4472

OTHER PUBLICATIONS

EP1361465A1 (Year: 2003).*
Extended European search report received for European Patent Application Serial No. 19894921.6 dated Jul. 13, 2022, 10 pages.
Communication pursuant to Rules 70(2) and 70a(2) EPC received for European Patent Application Serial No. 19894921.6 dated Aug. 2, 2022, 1 page.

* cited by examiner

*Primary Examiner* — Chad H Smith
(74) *Attorney, Agent, or Firm* — Amin, Turocy & Watson, LLP

(57) ABSTRACT

A fiber optic pigtail assembly that includes a plurality of optical fibers and at least one optical connector. The optical fibers each have a first end opposite a second end. The plurality of optical fibers are ribbonized together from the first end of each of the plurality of optical fibers partway toward the second end of each of the plurality of optical fibers and form a ribbonized end portion. The at least one optical connector is connected to the second end of each of the plurality of optical fibers. A loose portion of the plurality of optical fibers is positioned between the at least one optical connector and the ribbonized end portion.

20 Claims, 17 Drawing Sheets

FIBER OPTIC PIGTAIL ASSEMBLY

RELATED APPLICATION

The subject patent application is a continuation of, and claims priority to, U.S. patent application Ser. No. 16/868,732, filed May 7, 2020, and entitled "FIBER OPTIC PIGTAIL ASSEMBLY," which is a continuation of U.S. patent application Ser. No. 16/221,061 (now U.S. Pat. No. 10,663,687), filed Dec. 14, 2018, and entitled "FIBER OPTIC PIGTAIL ASSEMBLY." The entireties of these related applications are hereby incorporated by reference herein.

FIELD

The present disclosure is directed generally to methods of terminating fiber optic cables and, more particularly, to fiber optic pigtails used to terminate fiber optic cables.

BACKGROUND

A fiber optic pigtail includes a factory-installed optical connector on a first end of an optical fiber. A second end of the optical fiber is not pre-terminated to a connector at the factory but may later be terminated by an end-user, either by mechanical or fusion splicing, to a single fiber of a fiber optic cable. Typically, a fiber optic pigtail includes multiple optical fibers each having a factory-installed optical connector at a first end, being unterminated at a second end and thus available for termination via mechanical or fusion splicing to one of the multiple optical fibers of a fiber optic cable by an end-user. A fiber optic pigtail is used to terminate a fiber optic cable (e.g., a fiber optic trunk cable) at a fiber optic splice module. The optical connector(s) pre-installed on the first end of the fiber optic pigtail are each connected to an adapter within the splice module and the second end is mechanically or fusion spliced to the optical fibers of a fiber optic trunk cable.

Traditional fiber optic pigtails include a plurality of optical fibers that are either ribbonized together as a unit or individual (i.e., loose) in nature. Unfortunately, routing the ribbonized optical fibers inside a confined area, such as a cassette housing, is problematic because the ribbonized unit of optical fibers have a bend radius that is relatively large (compared to individual optical fibers) for the confined space inside the cassette housing. Further, each of the optical fibers may be attached to a different fiber optic connector (e.g., a Lucent Connector ("LC") connector) that is oriented in a first direction that is perpendicular to a second direction through which a portion of the optical fiber must be routed. For this reason, users often de-ribbonize at least a portion of a ribbonized fiber optic pigtail in the field.

Terminating a fiber optic pigtail that includes loose optical fibers requires ribbonizing the optical fibers in the field if the fiber optic pigtail is being used to terminate a fiber optic cable in which the cable fibers are ribbonized. In other words, users often ribbonize at least a portion of a loose fiber optic pigtail before using it to terminate a fiber optic cable with ribbonized cable fibers.

Unfortunately, ribbonizing or de-ribbonizing the optical fibers of the fiber optic pigtail in the field increases both time and expense associated with fiber optic installations.

BRIEF DESCRIPTION OF THE SEVERAL VIEWS OF THE DRAWING(S)

Like reference numerals have been used in the figures to identify like components.

DETAILED DESCRIPTION

Figure 1:
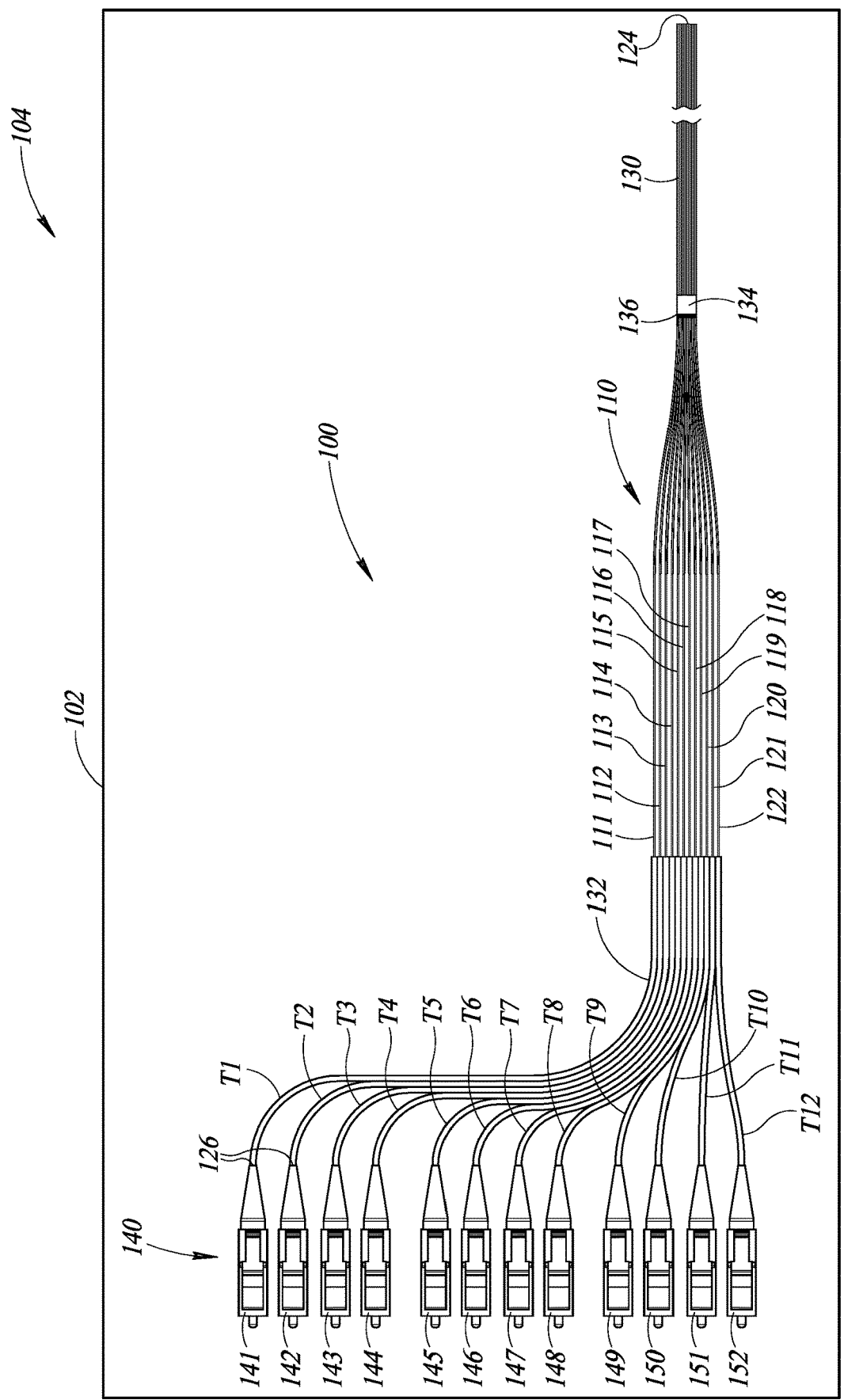
FIG. 1 is a top view of a first embodiment of a fiber optic pigtail assembly.
Figure 2:
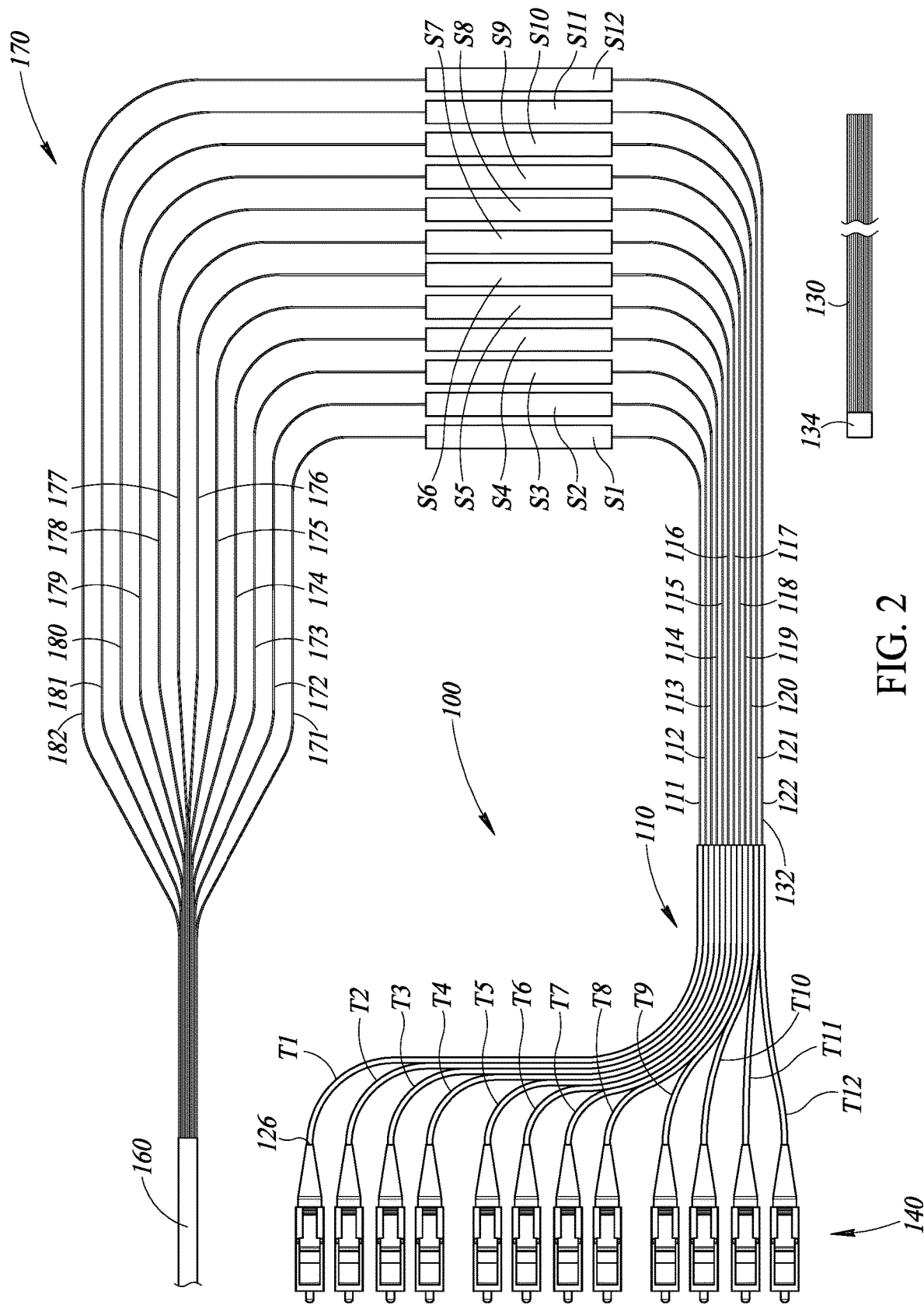
FIG. 2 is a top view of the first embodiment of the fiber optic pigtail assembly terminating a first version of a fiber optic cable that includes loose fibers.
Figure 3:
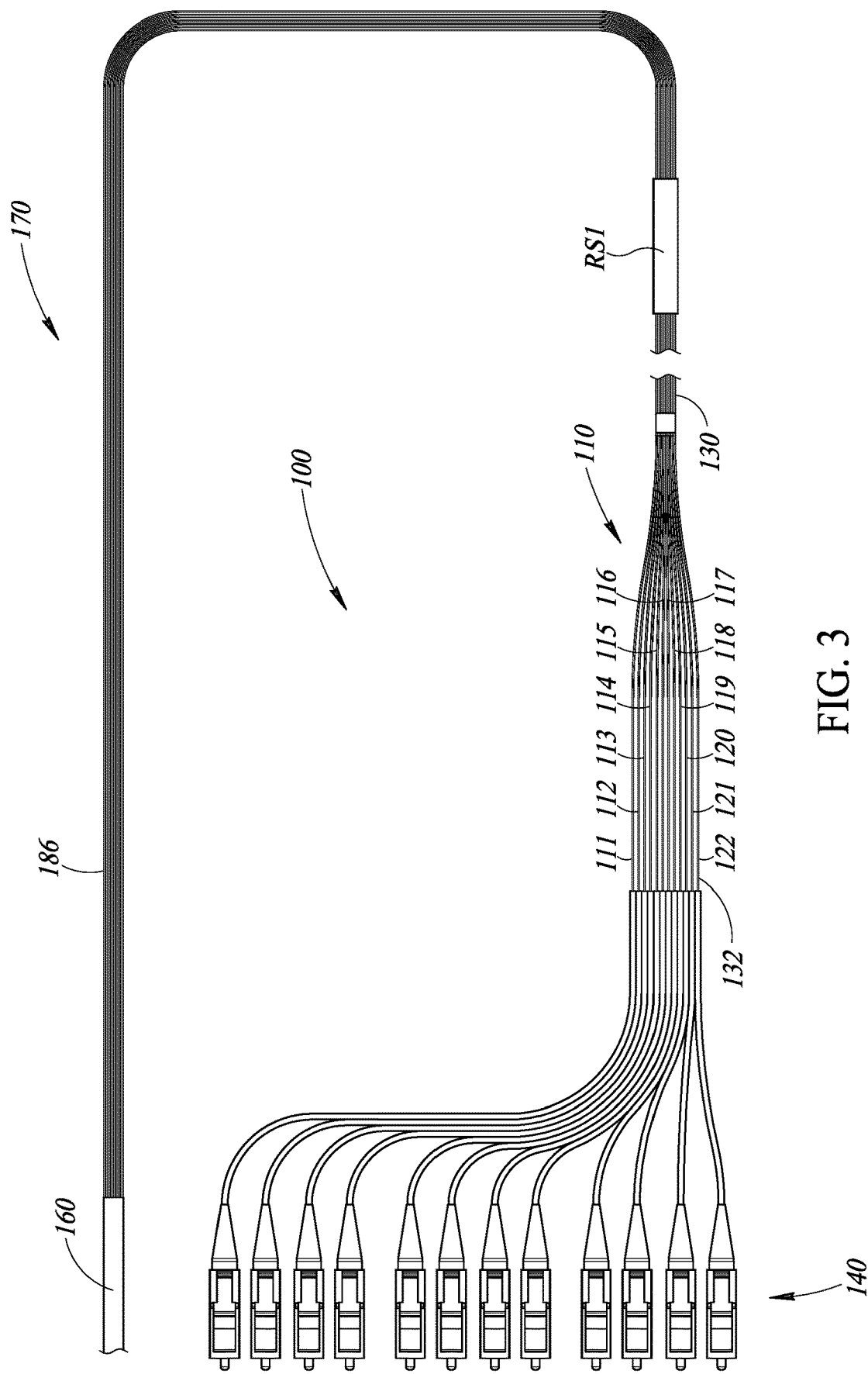
FIG. 3 is a top view of the first embodiment of the fiber optic pigtail assembly terminating a second version of the fiber optic cable that includes ribbonized fibers.

FIG. 1 illustrates a first embodiment of a fiber optic pigtail assembly 100. The pigtail assembly 100 includes a plurality of optical fibers 110 each configured to conduct a separate light signal. As will be described below, referring to FIG. 2, the pigtail assembly 100 is configured to terminate a fiber optic cable 160 (e.g., a fiber optic trunk cable) that includes cable fibers 171-182 that are either loose (as shown in FIG. 2) or ribbonized into a ribbon 186 (as shown in FIG. 3). Thus, the pigtail assembly 100 is configured to terminate a ribbonized or non-ribbonized fiber optic cable 160 without the need to change the ribbonization of the optical fibers 110 of the pigtail assembly 100, which simplifies the termination process. Referring to FIG. 1, the pigtail assembly 100 may be packaged in a package 102 and sold as a kit 104.

In the embodiment illustrated, the plurality of optical fibers 110 include twelve optical fibers 111-122 (e.g., having an outside diameter of about 250 μm). However, this is not a requirement and the pigtail assembly 100 may include a different number of fibers. Each of the plurality of optical fibers 110 has a first end portion 124 opposite a second end portion 126.

At least some of the optical fibers 111-122 may have different lengths. For example, the optical fiber 111 may be the longest and the optical fiber 120 may be the shortest. The optical fibers 119 and 121 may have the same length. By way of a non-limiting example, the optical fibers 111-122 may be listed from longest to shortest in the following order: optical fibers 111-118, optical fiber 122, optical fiber 119, optical fiber 121, and optical fiber 120. The length of each of the optical fibers 111-122 is configured to reduce an amount of the optical fiber that is removed by cleaving and/or splicing.

The first end portions 124 of the plurality of optical fibers 110 are ribbonized and form a ribbonized first portion 130 of the pigtail assembly 100. By way of a non-limiting example, the ribbonized first portion 130 may have a length of about 8.5 inches (216 mm). Within the ribbonized first portion 130, the plurality of optical fibers 110 are attached to one another and form a unit or ribbon. Thus, within the ribbonized first portion 130, the plurality of optical fibers 110 may be manipulated and routed as a unit.

A loose second portion 132 is adjacent the ribbonized first portion 130. In the embodiment illustrated in FIG. 1, the loose second portion 132 extends to the second end portion 126 of the plurality of optical fibers 110. Within the loose second portion 132, the plurality of optical fibers 110 are loose, not ribbonized, and may be manipulated and routed individually. A user may thus use either the ribbonized first end portion 124 or, referring to FIG. 2, cut off the ribbonized first portion 130 and use the loose second portion 132 to terminate the cable fibers 171-182 of the cable 160 to the pigtail assembly 100.

A demarcation 134 (e.g., a piece of heat shrink tape) may be placed at or near a junction 136 where the first and second portions 130 and 132 meet. Thus, the demarcation 134 may be positioned between the first and second end portions 124 and 126 of the plurality of optical fibers 110. The demarcation 134 may be used to determine where, if desired, to cut the pigtail assembly 100 to remove the ribbonized first portion 130.

The pigtail assembly 100 may include a protective feature or guard (not shown) positioned at the first end portions 124 that protects the first end portions 124 from damage that might occur during handling. The protective feature may be implemented as an adhesive bead or a piece of tape (e.g., heat shrink tape). The protective feature may help prevent the ribbonized first portion 130 from splitting at the first end portions 124 of the optical fibers 111-122.

The second end portions 126 of the plurality of optical fibers 110 are pre-connectorized to one or more fiber optic connectors 140. In the embodiment illustrated in FIG. 1, the second end portions 126 of the optical fibers 111-122 are connected to twelve fiber optic connectors 141-152, respectively. In this embodiment, the second end portions 126 of the optical fibers 111-122 are placed in tubes T1-T12 (e.g., having an outside diameter of about 900 μm). The tubes T1-T12 protect the second end portions 126 of the optical fibers 111-122 as they leave the fiber optic connectors 141-152, respectively. The tubes T1-T12 extend from the fiber optic connectors 141-152, respectively, partway toward the ribbonized first portion 130. By way of a non-limiting example, a distance of about 13 inches (33 mm) may extend along the loose second portion 132 from the junction 136 to the tubes T1-T12. By way of another non-limiting example, the tubes T1-T12 may have a length of approximately 7.8 inches (198 mm) to approximately 10 inches (254 mm). The tubes T1-T12 may each have a different color. For example, the tubes T1-T12 may be blue, orange, green, brown, slate, white, red, black, yellow, violet, rose, and aqua, respectively. As illustrated in FIG. 1, the tube T1 (e.g., colored blue) may be the longest and the tube T10 (e.g., colored violet) may be the shortest. By way of non-limiting examples, the tubes T1-T12 may have the lengths shown in Table A below:

TABLE A

| Tube | Color | Length (inches) | Length (mm) |
|---|---|---|---|
| T1 | blue | 10.0 | 254 |
| T2 | orange | 9.8 | 249 |
| T3 | green | 9.6 | 244 |
| T4 | brown | 9.4 | 239 |
| T5 | slate | 9.0 | 229 |
| T6 | white | 8.8 | 224 |
| T7 | red | 8.6 | 218 |
| T8 | black | 8.4 | 213 |
| T9 | yellow | 8.0 | 203 |
| T10 | violet | 7.8 | 198 |
| T11 | rose | 8.0 | 203 |
| T12 | aqua | 8.2 | 208 |

In the embodiment illustrated in FIG. 1 that retains the ribbonized first portion 130, each of the fiber optic connectors 141-152 has been implemented as a Lucent Connector ("LC") connector. However, this is not a requirement. Other types of fiber optic connectors may be used to implement each of the fiber optic connectors 141-152.

There are two versions of the fiber optic cable 160, which each include a plurality of cable fibers 170 each of which is an optical fiber configured to conduct a separate light signal. In the first version of the fiber optic cable 160, shown in FIG. 2, the plurality of cable fibers 170 include the loose individual cable fibers 171-182, which may be spliced to the corresponding loose optical fibers 111-122 in the loose second portion 132 of the pigtail assembly 100. In the second version of the fiber optic cable 160, shown in FIG. 3, the plurality of cable fibers 170 are ribbonized into the ribbon 186, which is configured to be spliced to the corresponding ribbonized first portion 130 of the pigtail assembly 100. Once the plurality of cable fibers 170 of the cable 160, whether arranged as the loose cable fibers 171-182 or as the ribbon 186, are spliced to the optical fibers 110 of the pigtail assembly 100, the transmitted light signals traverse the splice(s) and are transmitted between the optical fibers 111-122 of the pigtail assembly 100 and the cable fibers 171-182, respectively, of the cable 160.

Referring to FIG. 2, after the ribbonized first portion 130 has been cut off, the loose optical fibers 111-122 of the pigtail assembly 100 are configured to be spliced with the loose cable fibers 171-182 of the fiber optic cable 160. The optical fibers 111-122 may be spliced with the cable fibers 171-182, respectively, by mechanical splicing or using a process known as fusion splicing which is described in more detail below.

As noted, splicing of the optical fibers 111-122 of the pigtail assembly 100, whether via the loose second portion 132 (as shown in FIG. 2) or the ribbonized first portion 130 (as shown in FIG. 3) may be accomplished by fusion splicing or mechanical splicing. Referring to FIG. 2, when single fiber splicing is used to terminate the fiber optic cable 160, the ribbonized first portion 130 may be removed (e.g., cut) from the pigtail assembly 100. Then, the loose optical fibers 111-122 may be spliced individually with the corresponding individual cable fibers 171-182, respectively, and the splices may be housed inside splice sleeves S1-S12, respectively. Thus, as shown in FIG. 2, the loose optical fibers 111-122 of the pigtail assembly 100 may be spliced with the loose cable fibers 171-182, respectively, of the first version of the cable 160 without needing to de-ribbonize the optical fibers 111-122 because the pigtail assembly 100 already includes the loose second portion 132. Optionally, the kit 104 (see FIG. 1) may include the splice sleeves S1-S12.

On the other hand, referring to FIG. 3, when the splicing is performed using the ribbonized first portion 130 of the pigtail assembly 100, the splicing may typically be done by fusion splicing and is referred to as ribbonized fiber fusion splicing or mass fusion splicing. When mass fusion splicing is used to terminate the second version of the fiber optic cable 160, the first end portions 124 (see FIG. 1) of the optical fibers 111-122 of the pigtail assembly 100 may be spliced with the cable fibers 171-182, respectively, which are ribbonized into the ribbon 186 of the cable 160 and the splice may be housed inside a ribbon splice sleeve RS1. Thus, when the plurality of cable fibers 170 are ribbonized, as shown in FIG. 3, the ribbonized first portion 130 of the optical fibers 111-122 of the pigtail assembly 100 may be spliced with the ribbon 186, which includes the individual cable fibers 171-182 (see FIG. 2), respectively, without needing to first ribbonize the optical fibers 111-122 because the pigtail assembly 100 already includes the ribbonized first portion 130. Optionally, the kit 104 (see FIG. 1) may include the ribbon splice sleeve RS1.

Figure 4:
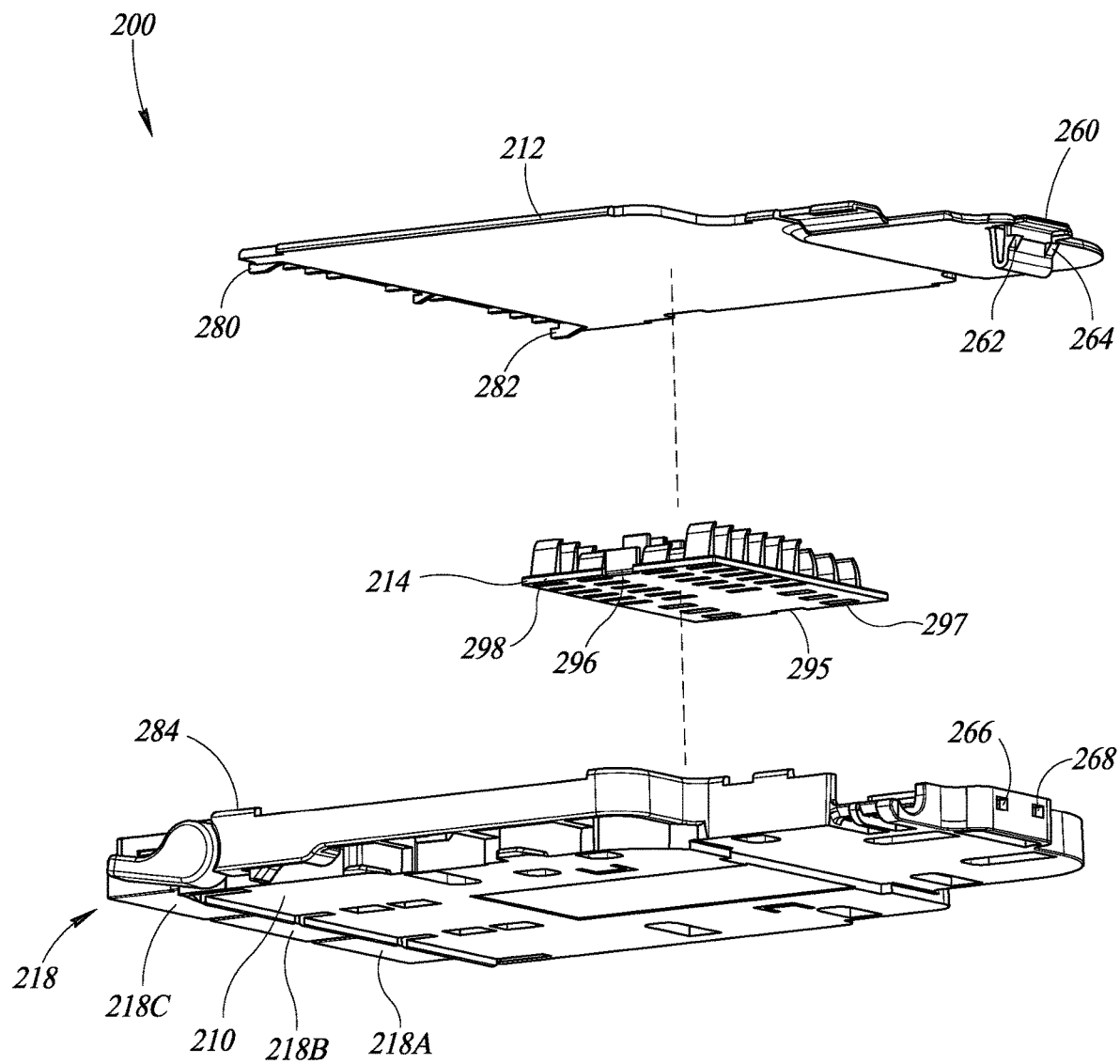
FIG. 4 is an exploded perspective view of an underside of a first version of a splice module or cassette for use with the first embodiment of the fiber optic pigtail assembly.
Figure 10:
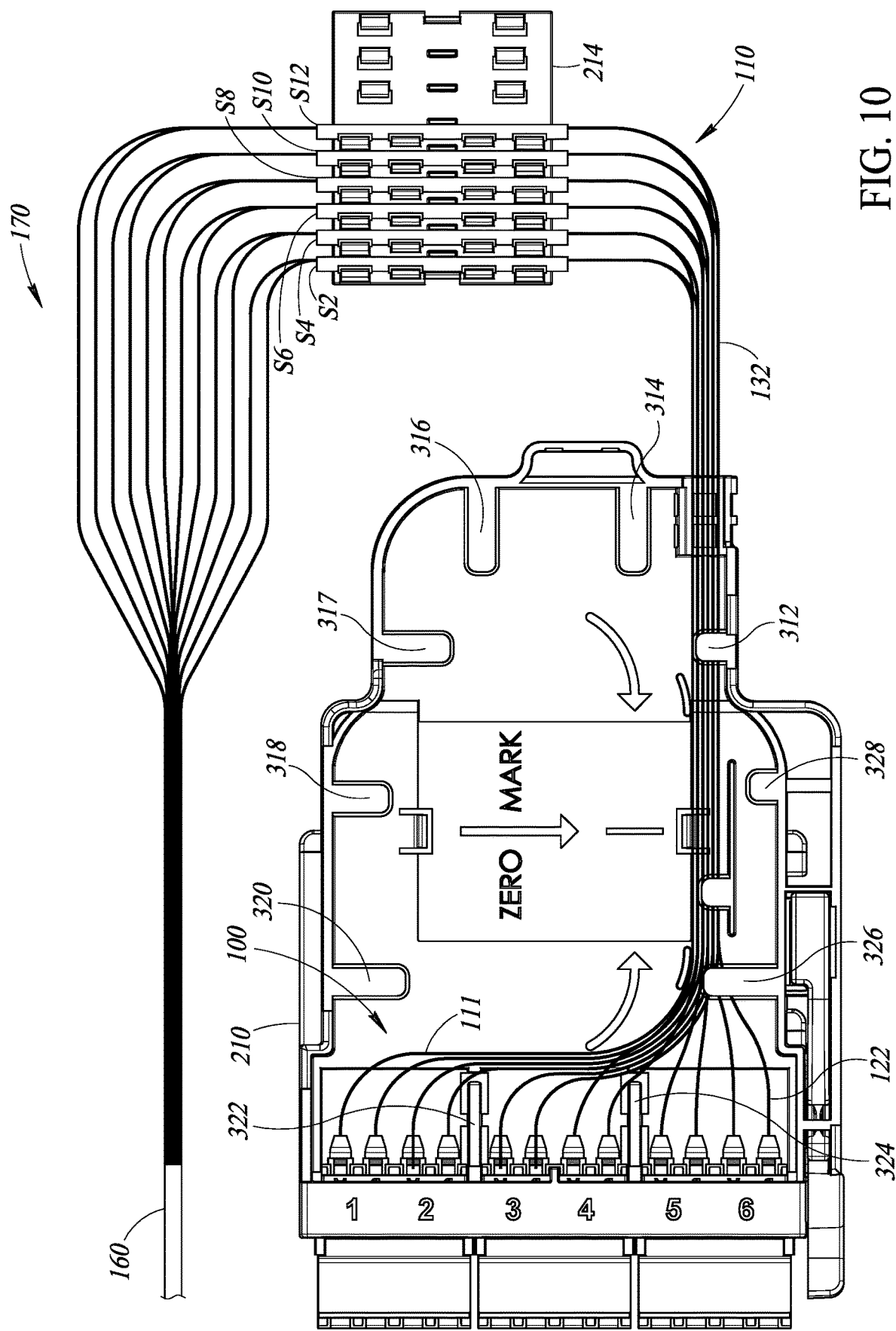
FIG. 10 is a top view of the first version of the cassette with the cover removed, the first embodiment of the fiber optic pigtail assembly spliced with the first version of the fiber optic cable, and fiber optic connectors of the first embodiment of the fiber optic pigtail assembly connected to the cassette.
Figure 11:
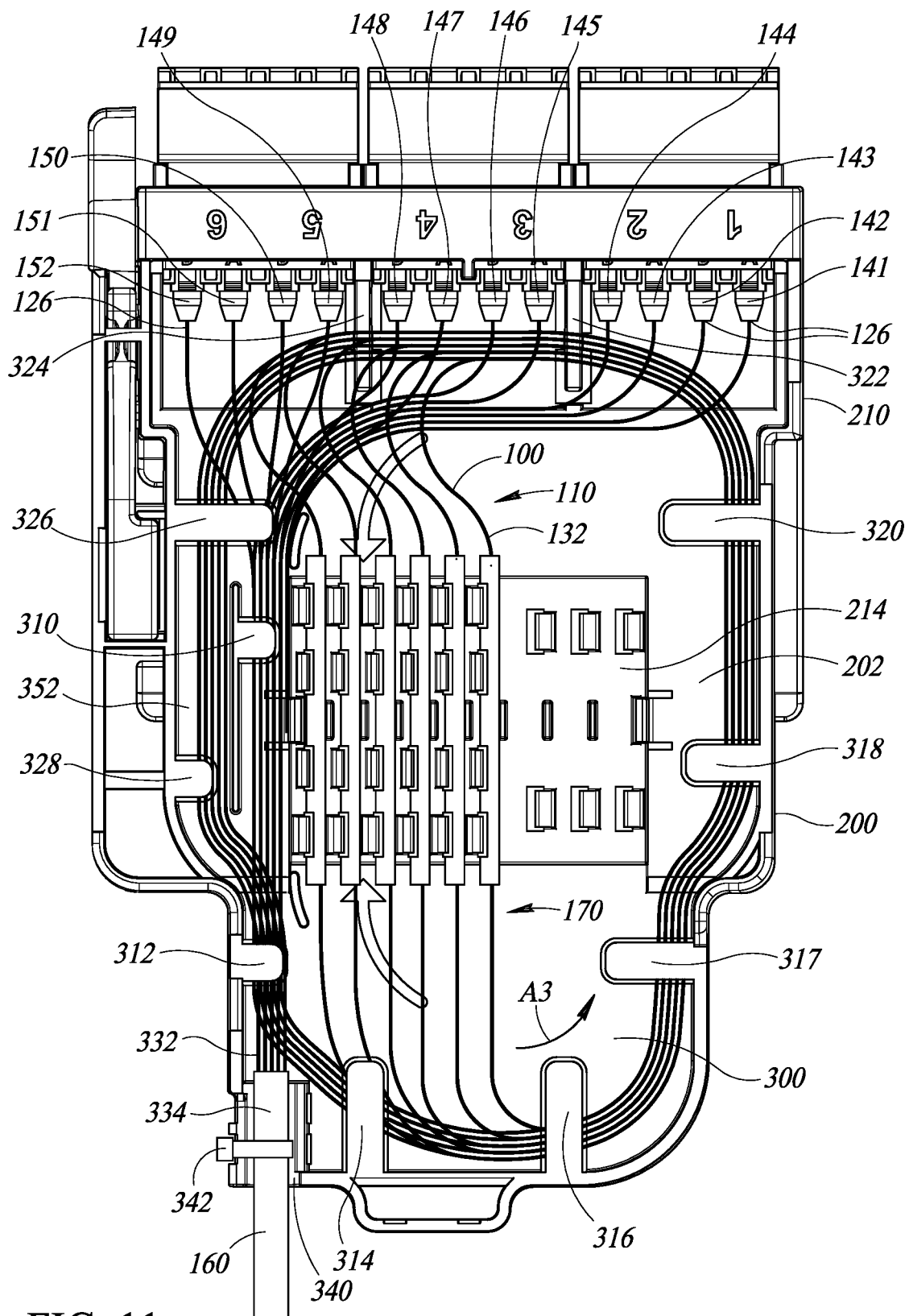
FIG. 11 is a top view of the first version of the cassette with the cover removed and the first embodiment of the fiber optic pigtail assembly terminating the first version of the fiber optic cable at the cassette.

The pigtail assembly 100 may be used with a splice module or cassette 200 illustrated in FIG. 4. Optionally, the kit 104 (see FIG. 1) may include the cassette 200. Referring to FIG. 4, the cassette 200 includes a base 210, one or more adapters 218, a removable cover 212, and a splice sleeve holder 214. FIG. 4 illustrates a first version of the cassette 200 configured for use with the first embodiment of the pigtail assembly 100 illustrated in FIGS. 1-3, 10, and 11. FIG. 11 illustrates the pigtail assembly 100 installed in a substantially hollow interior 202 of the first version of the cassette 200, which has been illustrated with its cover 212 (see FIGS. 4-6 and 13) removed. The pigtail assembly 100 is configured in such a way that the plurality of optical fibers 110 may be routed within the constrained hollow interior 202 without exceeding the bend radius of either the individual optical fibers of the plurality of optical fibers 110 within the loose second portion 132 or the more densely compacted fibers within the ribbonized first portion 130 (see FIGS. 1-3), when present, and to avoid possible damage to the optical fibers 110 of the pigtail assembly 100.

By way of non-limiting examples, the cassette 200 may be implemented as a splice module sold by Leviton under, for instance, one of the following module numbers: SPLCH-12AQ, SPLCH-12BL, SPLCH-12GN, SPLCH-12HV, SPMPH-MMPN, SPMPH-SMPN, SPMPH-MMUP, and SPMPH-SMUP.

Figure 5:
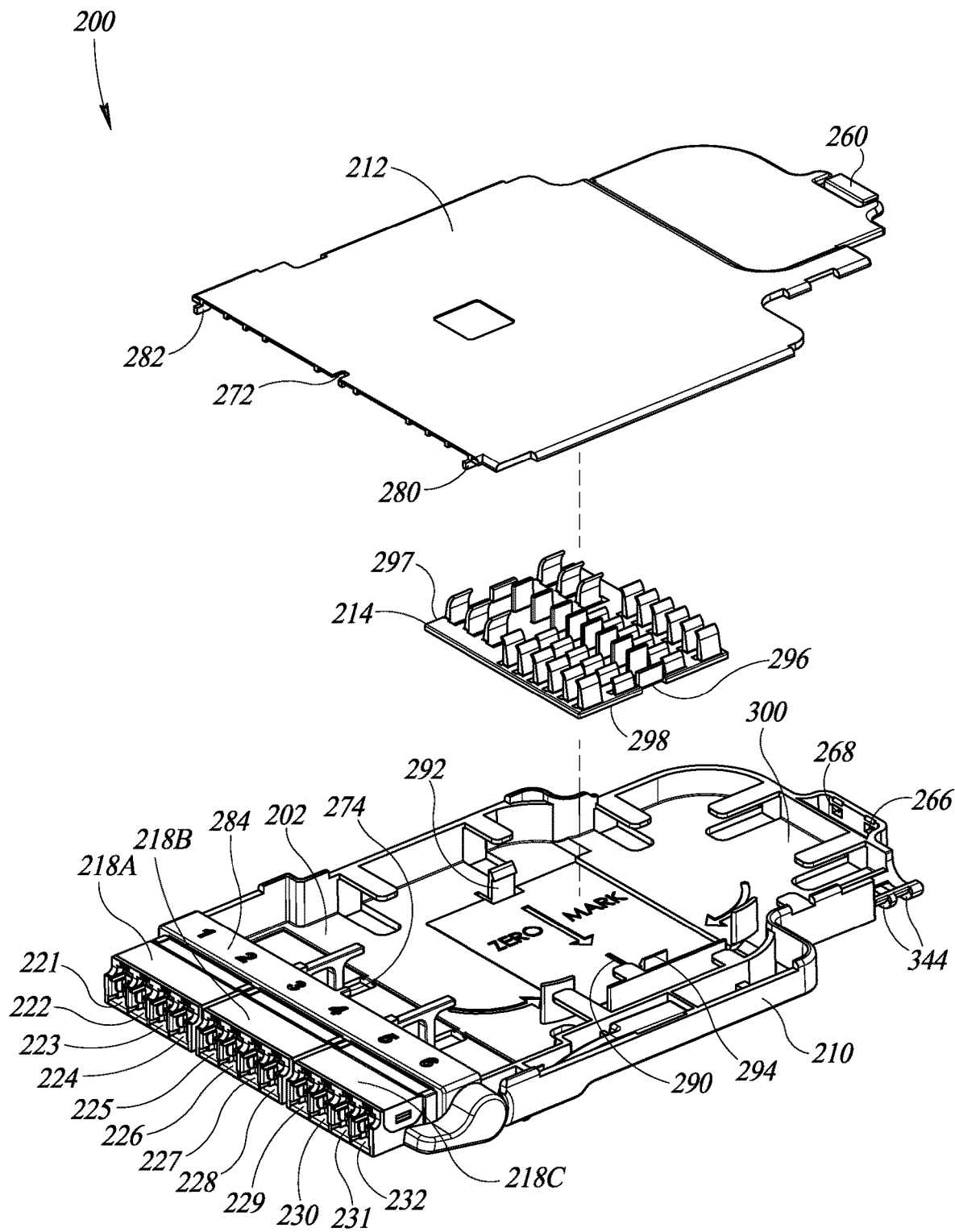
FIG. 5 is an exploded perspective view of a top side of the first version of the cassette of FIG. 4.
Figure 7:
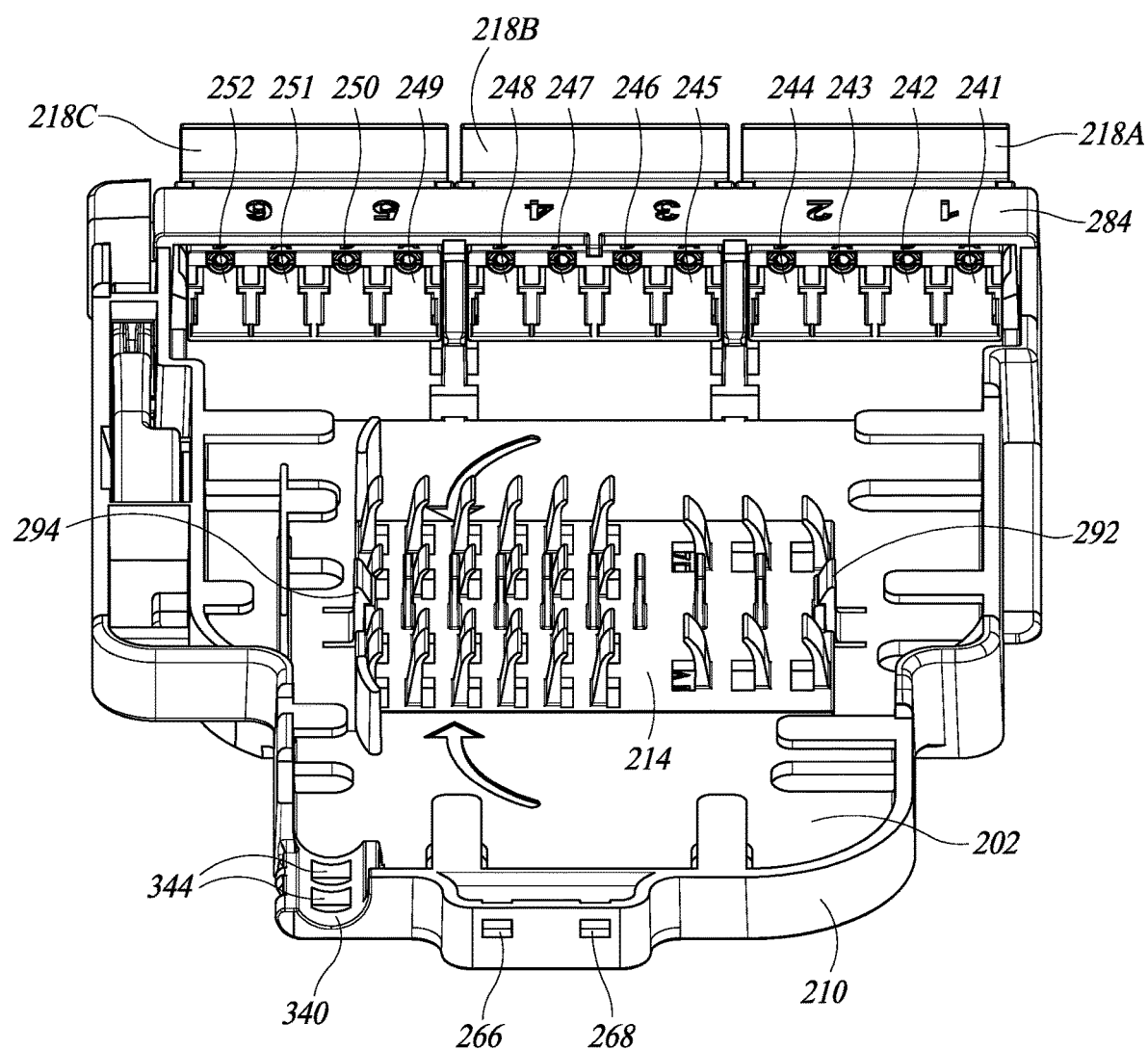
FIG. 7 is a rear perspective view of the first version of the cassette of FIG. 4 with the cover removed.

Referring to FIG. 5, in the first version of the cassette 200, the adapter(s) 218 include adapters 218A-218C, which are mounted in the base 210. The adapters 218A-218C include outwardly facing and opening ports 221-232 each configured to receive a single corresponding fiber optic connector (e.g., a LC connector), which is inserted into the corresponding outwardly facing port. Thus, twelve fiber optic connectors (not shown) may be inserted one each into the outwardly facing ports 221-232. Referring to FIG. 7, the adapters 218A-218C also include inwardly facing and opening ports 241-252 configured to receive the fiber optic connectors 141-152 (see FIGS. 1 and 11), respectively, of the pigtail assembly 100 (see FIGS. 1-3, 10, and 11). In the example illustrated, the adapter 218A includes the outwardly facing ports 221-224 (see FIG. 5) and the corresponding inwardly facing ports 241-244, respectively. The adapter 218A is thus configured to form optical connections between the fiber optic connectors (not shown) inserted into the outwardly facing ports 221-224 (see FIG. 5) and the fiber optic connectors 141-144 (see FIGS. 1 and 11) of the pigtail assembly 100 (see FIGS. 1-3, 10, and 11), when the fiber optic connectors 141-144 are inserted into the inwardly facing ports 241-244, respectively. The adapter 218B includes the outwardly facing ports 225-228 (see FIG. 5) and the inwardly facing ports 245-248. The adapter 218B is thus configured to form optical connections between the fiber optic connectors (not shown) inserted into the outwardly facing ports 225-228 (see FIG. 5) and the fiber optic connectors 145-148 (see FIGS. 1 and 11) of the pigtail assembly 100 (see FIGS. 1-3, 10, and 11), when the fiber optic connectors 145-148 are inserted into the inwardly facing ports 245-248, respectively. The adapter 218C includes the outwardly facing ports 229-232 (see FIG. 5) and the inwardly facing ports 249-252. The adapter 218C is thus configured to form optical connections between the fiber optic connectors (not shown) inserted into the outwardly facing ports 229-232 (see FIG. 5) and the fiber optic connectors 149-152 (see FIGS. 1 and 11), when the fiber optic connectors 149-152 are inserted into the inwardly facing ports 249-252, respectively.

Figure 6:
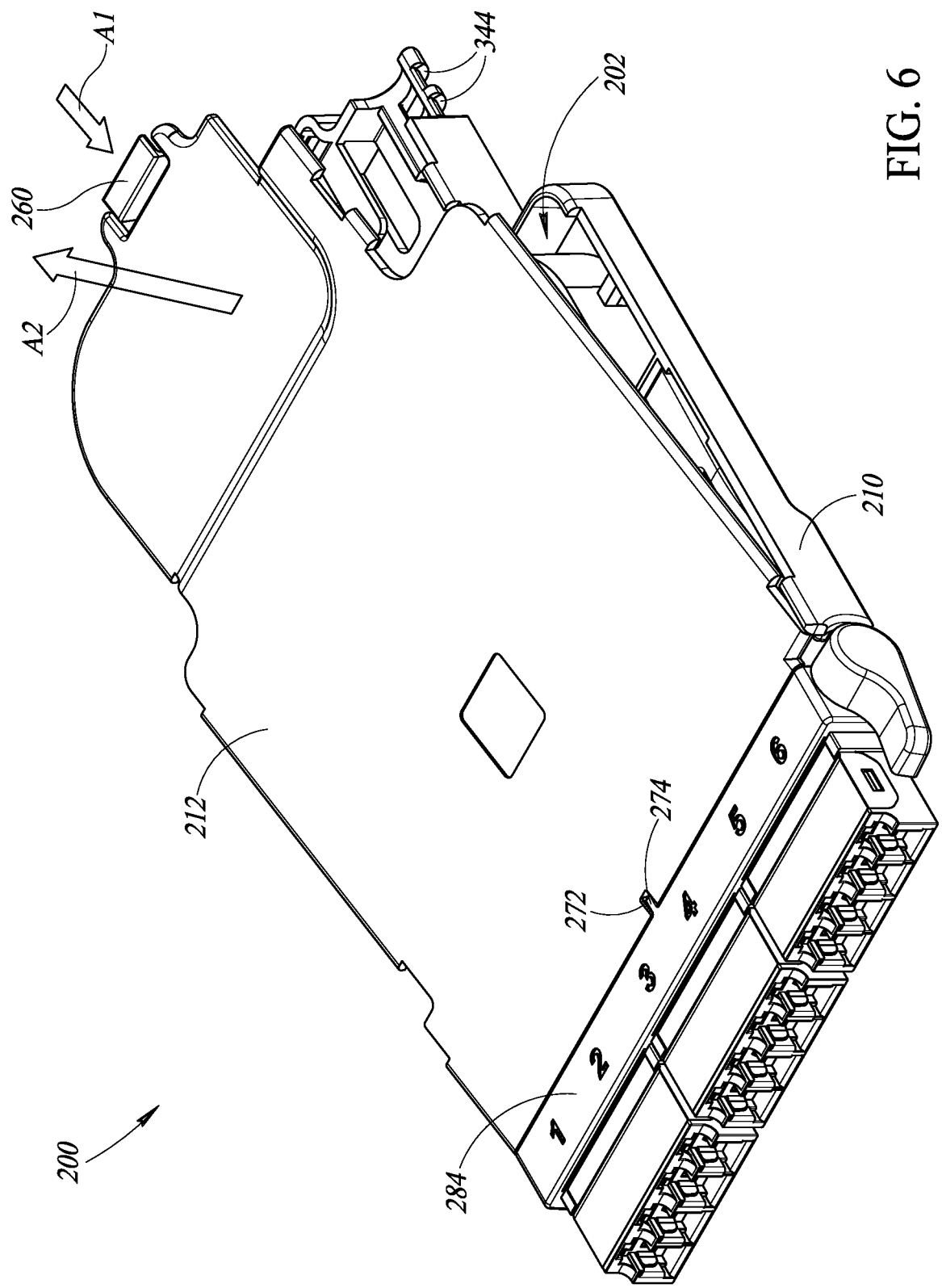
FIG. 6 is a front perspective view of a cover being removed from the first version of the cassette of FIG. 4.

Referring to FIG. 6, to terminate the fiber optic cable 160 (see FIGS. 2, 3, and 9-11), a user first opens the cassette 200. In the example illustrated, to open the cassette 200, the user pushes inwardly on a release tab 260, e.g., in a direction identified by an arrow A1, of the cover 212, which moves outwardly extending projections 262 and 264 (see FIG. 4) inwardly such that they are removed from openings 266 and 268 (see FIGS. 4, 5, 7, and 14), respectively, formed in the base 210. With the release tab 260 pushed inwardly, the user lifts upwardly and pulls outwardly (e.g., in a direction identified by an arrow A2) on the cover 212 so that tabs 280 and 282 (see FIGS. 4 and 5) formed in the cover 212 are pulled clear of an overhanging portion 284 of the base 210. When the cover 212 is attached to the base 210, a tab 274 disposed on the base 210 is positioned within a slot 272 disposed in the cover 212, the projections 262 and 264 (see FIG. 4) are positioned in the openings 266 and 268 (see FIGS. 4, 5, 7, and 14), respectively, and the tabs 280 and 282 (see FIGS. 4 and 5) are positioned under the overhanging portion 284 of the base 210. Thus, referring to FIG. 4, the projections 262 and 264 and the tabs 280 and 282 maintain the cover 212 on the base 210.

Referring to FIG. 5, when the cover 212 is removed, the interior 202 of the base 210 is accessible. If the splice sleeve holder 214 is installed within the interior 202 of the base 210, the user removes the splice sleeve holder 214 to expose a zero mark indicator 290. The splice sleeve holder 214 may be mounted inside the base 210 by first and second spring tabs 292 and 294, disposed on a bottom portion 300 of the base 210, positioned to grip onto the first and second opposing sides 297 and 298, respectively, of the splice sleeve holder 214. In the example illustrated in FIG. 5, the splice sleeve holder 214 includes first and second recesses 295 (see FIG. 4) and 296 formed on the opposing sides 297 and 298, respectively, of the splice sleeve holder 214. The first and second recesses 295 (see FIG. 4) and 296 are configured to receive the first and second spring tabs 292 and 294, respectively. The zero mark indicator 290 may be positioned on the bottom portion 300.

Figure 8:
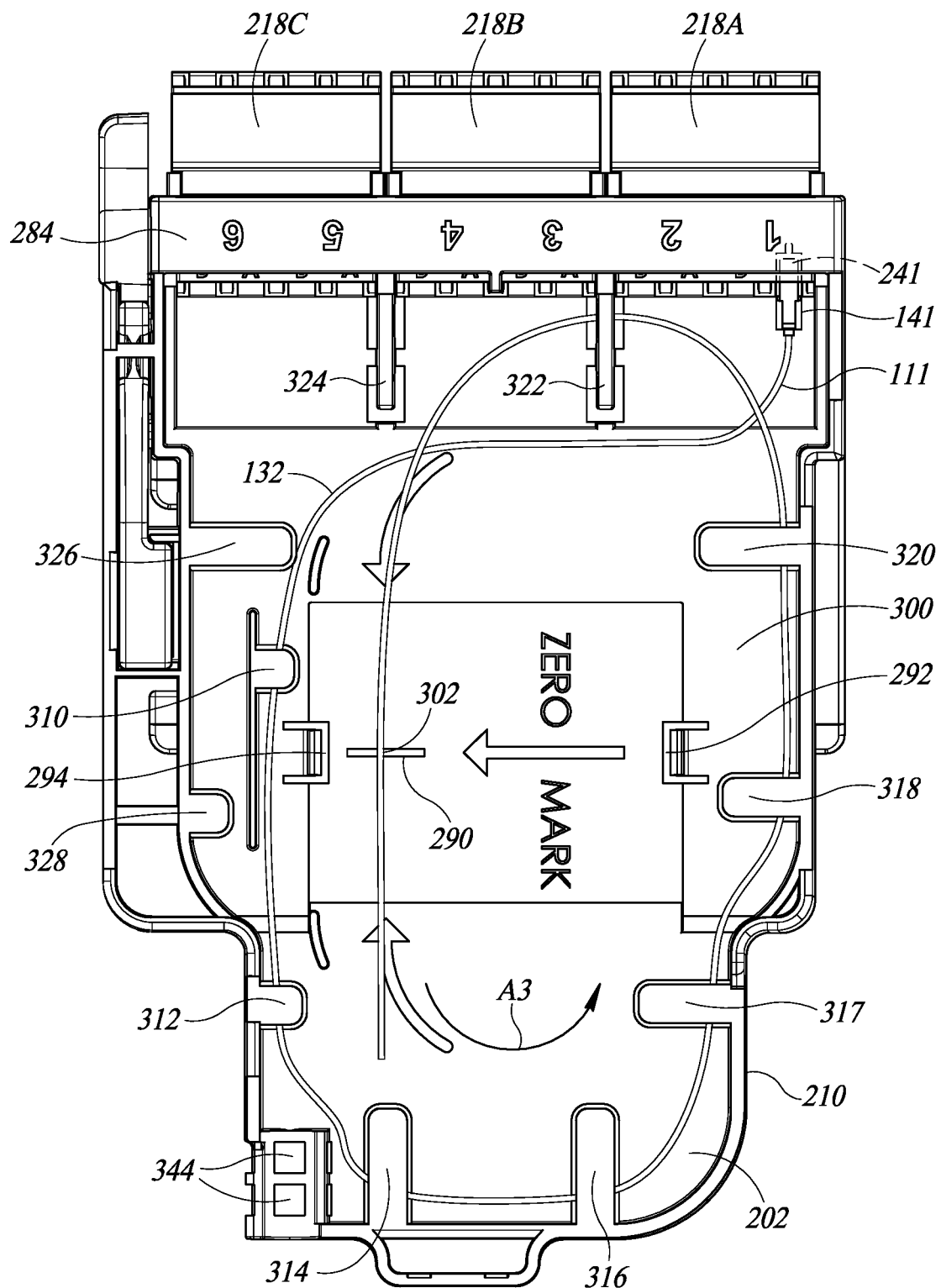
FIG. 8 is a top view of the first version of the cassette with the cover removed and an optical fiber of the first embodiment of the fiber optic pigtail assembly routed in the cassette's interior to be marked.

Next, referring to FIG. 8, the fiber optic connectors 141-152 (see Figures 1and 11) are inserted into the inwardly opening ports 241-252 (see FIG. 7), respectively, of the adapters 218A-218C. For example, FIG. 8 illustrates the fiber optic connector 141 inserted into the inwardly opening port 241. The optical fibers 111-122 (see FIGS. 1-3) may be routed one at a time underneath cable management tabs 310-322 (and optionally underneath a cable management tab 324) formed in the bottom portion 300. For example, the optical fibers 111-122 (see FIGS. 1-3) may each be placed under the cable management tabs 310-324 in the following order starting from the adapters 218A-218C: cable management tabs 310, 312, 314, 316, 317, 318, 320, 322, and 324. For ease of illustration, FIG. 8 illustrates only the optical fiber 111 being routed. However, the other optical fibers 112-122 (see FIGS. 1-3) are routed in a similar manner. In the implementation illustrated, the optical fiber 111 is routed in a counter-clockwise direction illustrated by a curved arrow A3 in one or more complete loops. If, as illustrated in FIG. 3, the loose second portion 132 will be used to terminate the fiber optic cable 160, one complete loop within the cassette 200 may be used. Alternatively, if, as shown in FIG. 3, the ribbonized first portion 130 will be used to terminate the fiber optic cable 160, two complete loops within the cassette 200 may be used.

Referring to FIG. 8, once the optical fibers 111-122 (see FIGS. 1-3) are disposed and routed within the base 210 of the cassette 200, a portion, designated by reference numeral 302, of each of the optical fibers 111-122 corresponding to the zero mark indicator 290 is marked (e.g., with a pen). After the optical fibers 111-122 (see FIGS. 1-3) have been marked at the portion 302, the optical fibers 111-122 are removed from the cable management tabs 310-324 and set aside while the fiber optic connectors 141-152 (see FIGS. 1 and 11) remain mated with the inwardly opening ports 241-252 (see FIG. 7), respectively, of the adapters 218A-218C.

Figure 9:
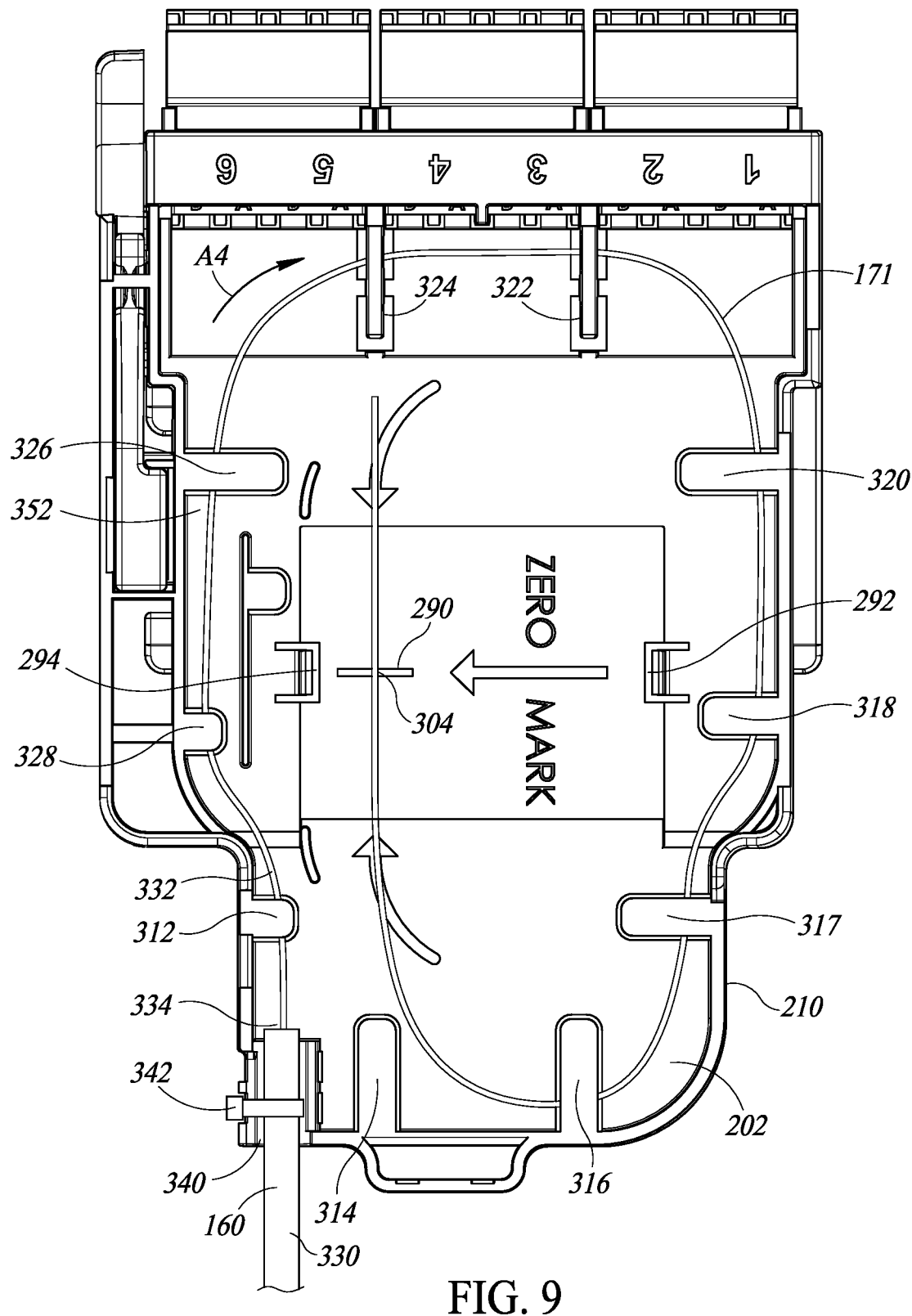
FIG. 9 is a top view of the first version of the cassette with the cover removed and a cable fiber of the first version of the fiber optic cable routed in the cassette's interior to be marked.

Referring to FIG. 9, the cable fibers 171-182 (see FIG. 2) of the first version of the fiber optic cable 160 are enclosed within an outer cable jacket 330. A portion of the outer cable jacket 330 may be removed to define an unjacketed portion 332 of the cable fibers 171-182 (see FIG. 2), which may be about 35 inches long. The unjacketed portion 332 and an adjacent jacketed portion 334 of the fiber optic cable 160 are routed into the interior 202 of the base 210 through a cable opening 340 in the base 210. One or more cable ties 342 (or similar structures) may be used to secure the jacketed portion 334 to the base 210. In the example illustrated, the base 210 includes tie wrap slots 344 (see FIGS. 5-8) configured to receive the cable tie(s) 342. The cable tie(s) 342 may each be implemented as a nylon cable tie.

Each of the cable fibers 171-182 (see FIG. 2) in the unjacketed portion 332 may be routed one at a time in a clockwise direction illustrated by a curved arrow A4 and positioned underneath the cable management tabs 312-324 as well as underneath outer channel cable management tabs 326 and 328. For example, each of the cable fibers 171-182 (see FIG. 2) may be placed under the cable management tabs 312-328 in the following order starting from the cable opening 340: cable management tabs 312, 328, 326, 324, 322, 320, 318, 317, 316, and 314. An outermost channel 352 may be defined at least in part by the outer channel cable management tabs 326 and 328. For ease of illustration, FIG. 9 illustrates only the cable fiber 171 being routed and the other cable fibers 172-182 (see FIG. 2) have been omitted from the fiber optic cable 160. However, the other cable fibers 172-182 (see FIG. 2) are routed inside the base 210 in a manner similar to the routing of the cable fiber 171.

Once the cable fibers 171-182 (see FIG. 2) are disposed and routed within the base 210, a portion, designated by reference numeral 304 in FIG. 9, of each of the cable fibers 171-182 (see FIG. 2) corresponding to the zero mark indicator 290 is marked (e.g., with a pen). After each of the cable fibers 171-182 (see FIG. 2) has been marked at the portion 304, the cable fiber may be removed from the cable management tabs 312-328 and set aside. The cable tie(s) 342 may be cut and the fiber optic cable 160 removed from the base 210.

Referring to FIG. 2, after each of the cable fibers 171-182 of the fiber optic cable 160 has been marked, they are cut at or near the location of the marks placed in the portions 304 (see FIG. 9). For example, the cable fibers 171-182 may be cut a predetermined distance (e.g., 35 mm) beyond their respective marks. Thus, a cut end portion of the cable fibers 171-182 may extend outwardly beyond the marks. The user may strip or remove an outer coating from the cut end portion to the mark made on each of the cable fibers 171-182 to expose an end section of bare fiber and allow for proper cleaving. The cleaving process may trim the length of the end section of bare fiber of each of the cable fibers 171-182 (e.g., to approximately 10 mm). The predetermined distance (e.g., 35 mm) may vary depending upon which cleaver is being used to cleave the cable fibers 171-182.

After each of the optical fibers 111-122 of the pigtail assembly 100 has been marked at the portion 302 (see FIG. 8), the user may install the splice sleeves S1-S12, respectively, and cut the optical fibers 111-122 at or near the location of the marks placed in the portions 302. For example, the optical fibers 111-122 may be cut the predetermined distance (e.g., 35 mm) beyond their respective marks. Thus, a cut end portion of the optical fibers 111-122 may extend outwardly beyond the marks. The user may strip or remove an outer coating from the cut end portion to the mark made on each of the optical fibers 111-122 to expose an end section of bare fiber and allow for proper cleaving. The cleaving process may trim the length of the end section of bare fiber of each of the optical fibers 111-122 (e.g., to approximately 10 mm). As mentioned above, the predetermined distance (e.g., 35 mm) may vary depending upon which cleaver is being used to cleave the optical fibers 111-122.

Once each of the optical fibers 111-122 of the pigtail assembly 100 and the cable fibers 171-182 of the fiber optic cable 160 have been marked and cut, the user may splice each of the optical fibers 111-122 of the pigtail assembly 100 to the corresponding cable fiber of the fiber optic cable 160 (i.e., the optical fiber 111 is spliced to the cable fiber 171, the optical fiber 112 is spliced to the cable fiber 172, and so forth, as shown in FIG. 2) using conventional methods of splicing optical fibers known in the industry, such as mechanical splicing or fusion splicing. Then, as shown in FIG. 10, the user places the splice sleeves S1-S12 (see FIG. 2) in the splice sleeve holder 214, which has been removed from the base 210. In the example illustrated in FIG. 10, the splice sleeves S2, S4, S6, S8, S10, and S12 are placed on top of the splice sleeves S1, S3, S5, S7, S9, and S11 (see FIG. 2), respectively, in the splice sleeve holder 214.

As mentioned above, referring to FIG. 11, the fiber optic connectors 141-152 (see FIGS. 1 and 11) were mated previously with the inwardly opening ports 241-252 (see FIG. 7), respectively, of the adapters 218A-218C. Next, the user routes the plurality of optical fibers 110 underneath the cable management tabs 310-324 in the counter-clockwise direction illustrated by the curved arrow A3. The user may rotate the base 210 clockwise while placing the plurality of optical fibers 110 underneath the cable management tabs 310-324. For example, the plurality of optical fibers 110 may be placed under the cable management tabs 310-324 in the following order starting from the adapters 218A-218C: cable management tabs 310, 312, 314, 316, 317, 318, 320, 322, and 324. After the plurality of optical fibers 110 has completed one full rotation within the base 210 of the cassette 200, the user may install the splice sleeve holder 214 between the first and second spring tabs 292 and 294 (see FIGS. 5, 7-9, and 16) on the bottom portion 300 of the base 210 and place a portion of the plurality of optical fibers 110 under (or on top of) the fiber optic connectors 141-152.

The user may continue rotating the base 210 clockwise and position the plurality of cable fibers 170 under the cable management tabs 312-328. For example, the plurality of cable fibers 170 may be placed under the cable management tabs 312-328 in the following order starting from the sleeve holder 214: cable management tabs 314, 316, 317, 318, 320, 322, 324, 326, 328, and 312. The user places a portion of each of the unjacketed plurality of cable fibers 170 in the outermost channel 352 defined by the outer channel cable management tabs 326 and 328. Then, the jacketed portion 334 is routed out the cable opening 340. Finally, the user may secure the jacketed portion 334 to the base 210 using one or more of the cable tie(s) 342 and installs the cover 212 (see FIGS. 4-6 and 13) on the base 210. Referring to FIG. 5, at this point, the cassette 200 is ready for use and one or more fiber optic connectors (not shown) may be inserted into each of the outwardly facing ports 221-232.

Figure 12:
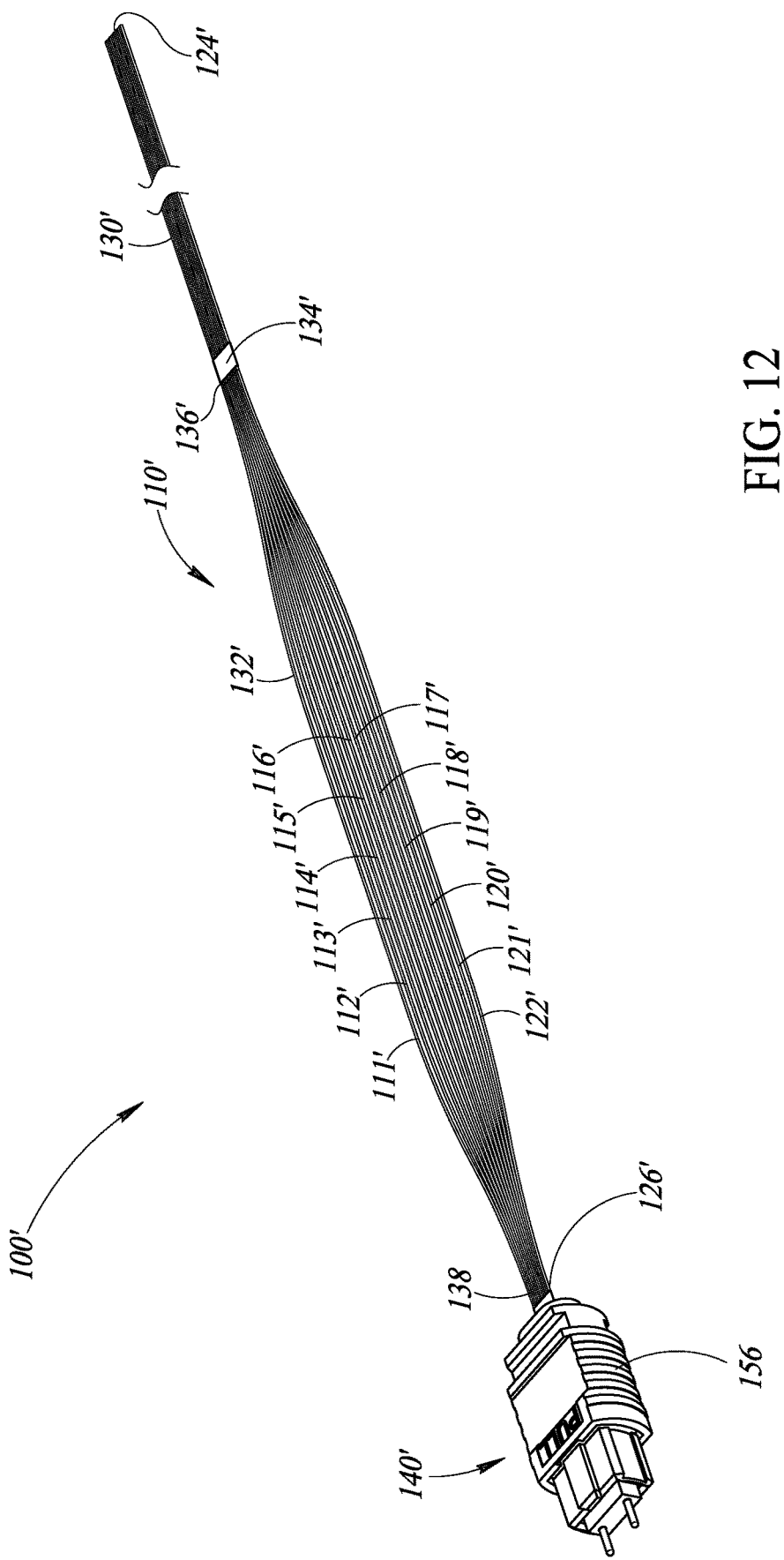
FIG. 12 is a perspective view of a second embodiment of the fiber optic pigtail assembly.

FIG. 12 illustrates a second embodiment of a pigtail assembly 100' that is substantially similar to the pigtail assembly 100 (see FIGS. 1-3, 10, and 11). Therefore, like reference numerals followed by a prime ("'") have been used to identify like components of the pigtail assembly 100' and the pigtail assembly 100 (see FIGS. 1-3, 10, and 11). However, the pigtail assembly 100' differs from the pigtail assembly 100 (see FIGS. 1-3, 10, and 11) in three respects. First, in the pigtail assembly 100', second end portions 126' of the plurality of optical fibers 110' are connected to a single, multi-fiber optical connector 156, instead of the plurality of individual fiber optic connectors 141-152 (see FIGS. 1 and 11).

Second, the tubes T1-T12 (see FIGS. 1 and 2) are omitted from the pigtail assembly 100'. Third, the plurality of optical fibers 110' may each have the same length. The pigtail assembly 100' may be packaged in the package 102 (see FIG. 1) and sold in the kit 104 (see FIG. 1) along with or instead of the pigtail assembly 100 (see FIGS. 1-3, 10, and 11).

The plurality of optical fibers 110' include optical fibers 111'-122', which have a ribbonized first portion 130' adjacent a loose second portion 132'. The ribbonized first portion 130' is formed at first end portions 124' of the optical fibers 111'-122'. The second end portions 126' of the optical fibers 111'-122' may be ribbonized to form a ribbonized third portion 138. The loose second portion 132' is positioned between the ribbonized first portion 130' and the ribbonized third portion 138. Thus, the first and second end portions 124' and 126' of the plurality of optical fibers 110' are each ribbonized and the loose second portion 132' is positioned between the ribbonized first and second end portions 124' and 126'. The ribbonized third portion 138 may include a demarcation (not shown) substantially similar to a demarcation 134', which may be implemented as a piece of heat shrink tape (e.g., having a length of approximately 5 mm).

The multi-fiber optical connector 156 has been illustrated as being implemented as a male version of a Multi-Fiber Termination Push-On ("MTP") connector. However, this is not a requirement. Other types of fiber optic connectors, such as a female version of the MTP connector may be used to implement the multi-fiber optical connector 156.

Figure 13:
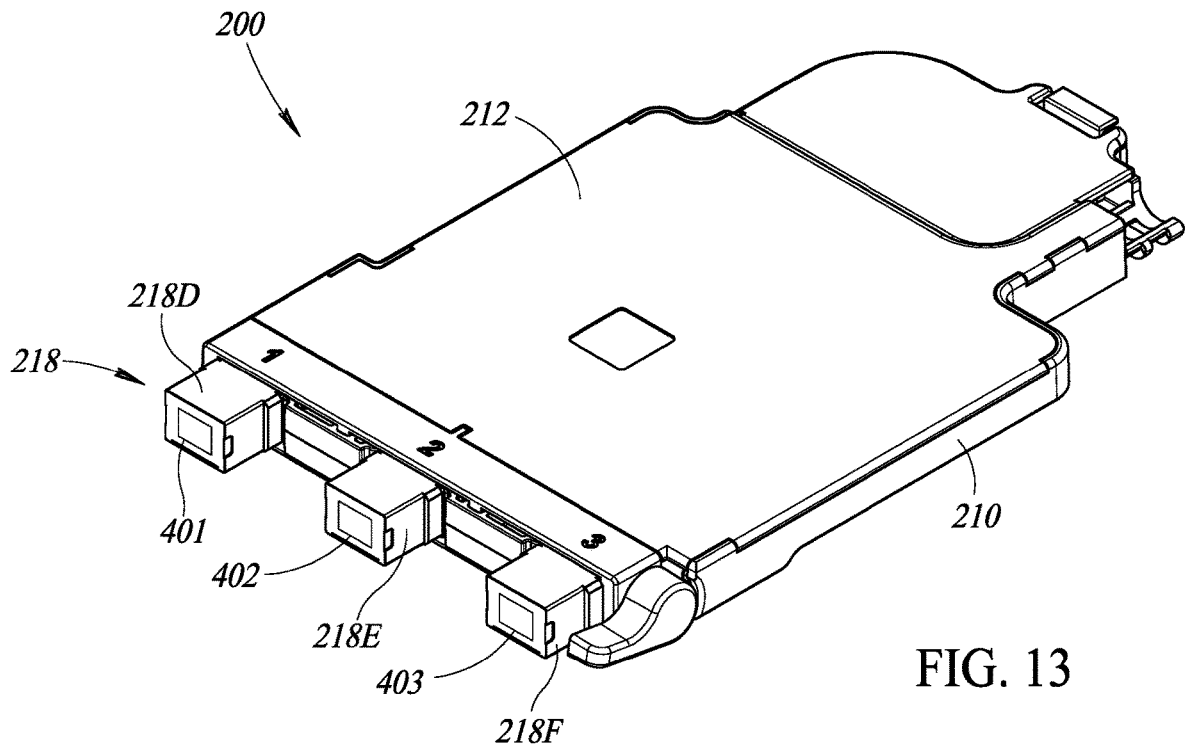
FIG. 13 is an exploded perspective view of a top side of a second version of the cassette.

FIG. 13 illustrates a second version of the cassette 200 configured for use with three assemblies 100A-100C (see FIGS. 15 and 17) each like the pigtail assembly 100' illustrated in FIG. 12. Referring to FIG. 13, the second version of the cassette 200 is substantially identical to the first version, except the adapter(s) 218 include adapters 218D-218F, which are configured to receive multi-fiber optical connectors 156A-156C, instead of the adapters 218A-218C, which are configured to receive the individual fiber optic connectors 141-152 (see FIGS. 4, 5, 7, and 8). The adapters 218D-218F include outwardly facing apertures 401-403, respectively, configured to be mated to multi-fiber optical connectors 156A-156C, respectively. Thus, three multi-fiber optic connectors (not shown) may be coupled with each of the outwardly facing apertures 401-403 to form and retain optical connections between the optical fibers therein and the optical fibers in multi-fiber optical connectors 156A-156C. Optionally, referring to FIG. 15, dust caps 404-406 may be positioned in and/or over the outwardly facing apertures 401-403 (see FIG. 13), respectively, to protect them from contaminant intrusion during handling. The dust caps 404-406 may be removed so that the multi-fiber optic connectors (not shown) may be inserted into or received by the outwardly facing apertures 401-403 (see FIG. 13), respectively.

Figure 14:
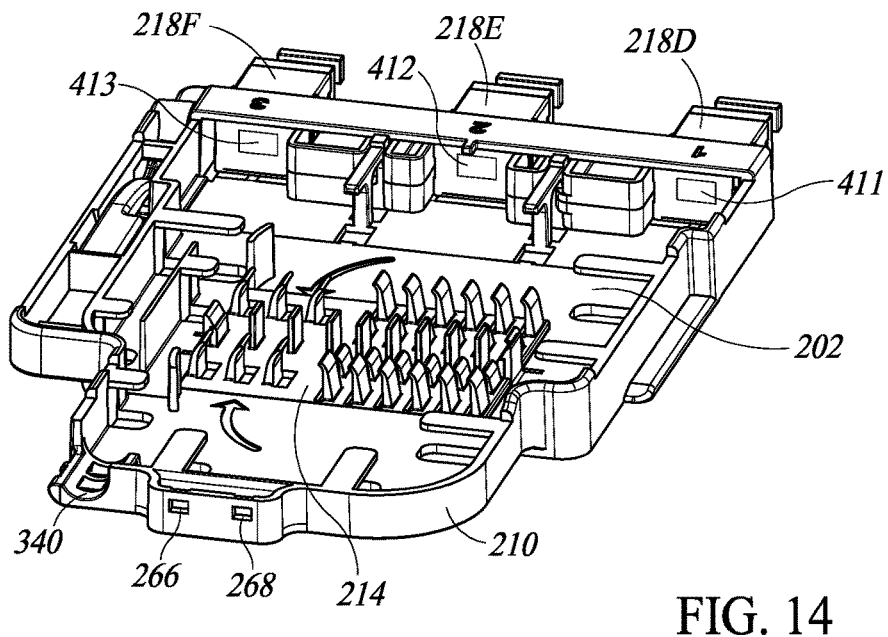
FIG. 14 is a top side rear perspective view of the second version of the cassette of FIG. 13 with its cover removed.

Referring to FIG. 14, the adapters 218D-218F include inwardly facing apertures 411-413 configured to receive complementary multi-fiber optical connectors 156A-156C (see FIGS. 15 and 17), respectively, of the assemblies 100A-100C (see FIGS. 15 and 17), respectively, and form and retain optical connections between the optical fibers therein and the multi-fiber optical connectors (not shown) coupled to outwardly facing apertures 401-403. In the example illustrated, the adapter 218D includes the outwardly facing aperture 401 (see FIG. 13) and the inwardly facing aperture 411 and is configured to form an optical connection between the multi-fiber optical connectors coupled by means of adapter 218D. The adapter 218E includes the outwardly facing aperture 402 (see FIG. 13) and the inwardly facing aperture 412 and is configured to form an optical connection between the multi-fiber optical connectors coupled by means of adapter 218E. The adapter 218F includes the outwardly facing aperture 403 (see FIG. 13) and the inwardly facing aperture 413 and is configured to form an optical connection between the multi-fiber optical connectors coupled by means of adapter 218F.

The example illustrated in FIGS. 13-18 is configured to terminate one or more cables each like the fiber optic cable 160 (see FIGS. 2, 3, and 9-11).

By way of a non-limiting example, referring to FIG. 13, the second version of the cassette 200 may be used to terminate three cables (not shown) that each includes a single ribbon like the ribbon 186 (see FIG. 3). By way of another non-limiting example, referring to FIG. 18, the second version of the cassette 200 may be used to terminate a single cable 420 that includes three ribbons 421-423 each like the ribbon 186 (see FIG. 3).

Figure 15:
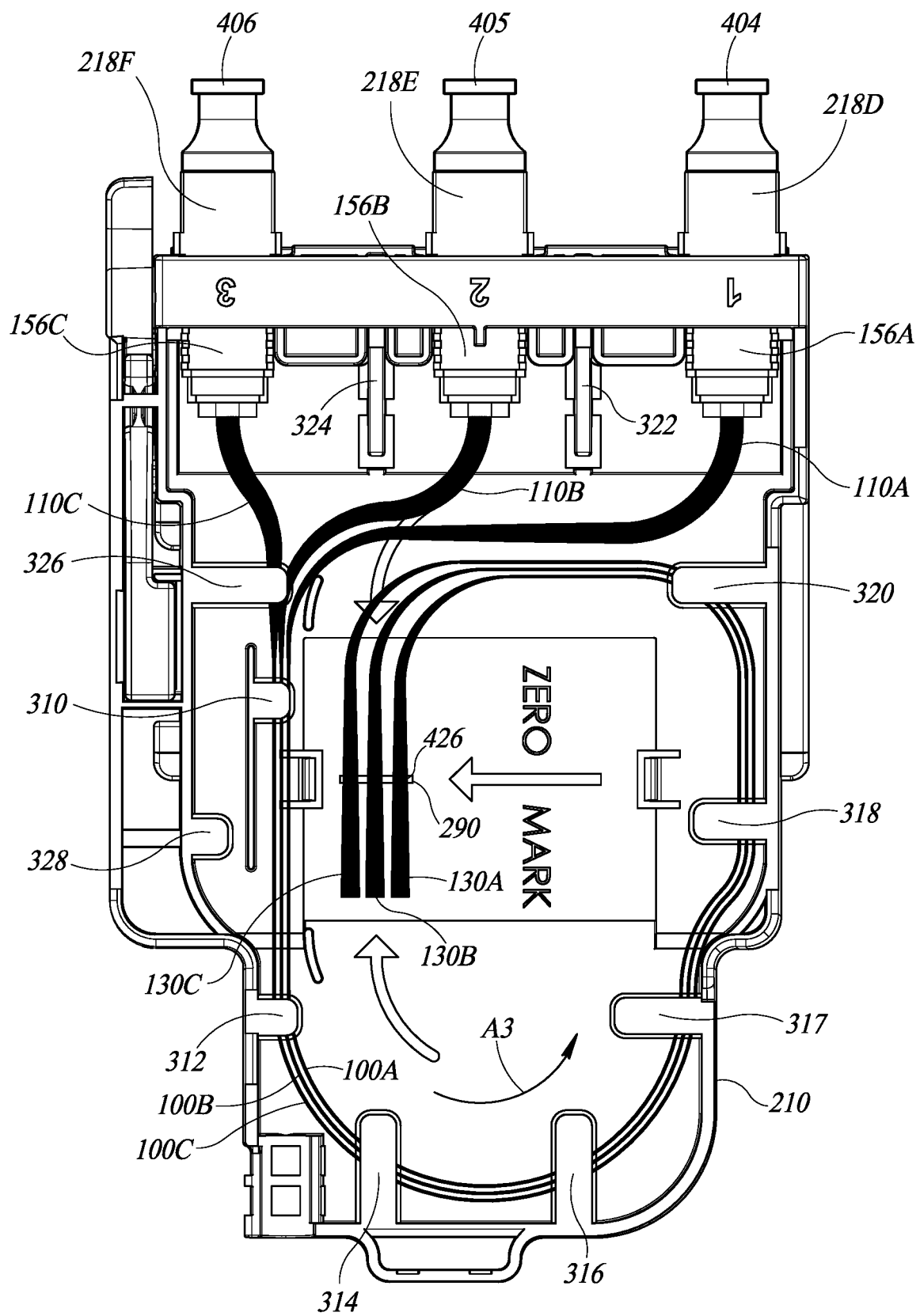
FIG. 15 is a top view of the second version of the cassette with its cover removed and three fiber optic pigtail assemblies each like the second embodiment of the fiber optic pigtail assembly routed in the cassette's interior to be marked.

Referring to FIG. 13, to terminate the cable 420 (see FIGS. 16-18), the user first opens the cassette 200 in the same manner described above. Referring to FIG. 14, if the splice sleeve holder 214 is installed within the interior 202 of the base 210, the user removes the splice sleeve holder 214 in the same manner described above. Referring to FIG. 15, as mentioned above, removing the splice sleeve holder 214 (see FIGS. 4, 5, 7, 11, 14, 17, and 18) exposes the zero mark indicator 290. The assembly 100A includes a plurality of optical fibers 110A, the assembly 100B includes a plurality of optical fibers 110B, and the assembly 100C includes a plurality of optical fibers 110C. Thus, the assemblies 100A-100C include the pluralities of optical fibers 110A-110C, respectively. The pluralities of optical fibers 110A-110C have ribbonized first portions 130A-130C, respectively.

Figure 17:
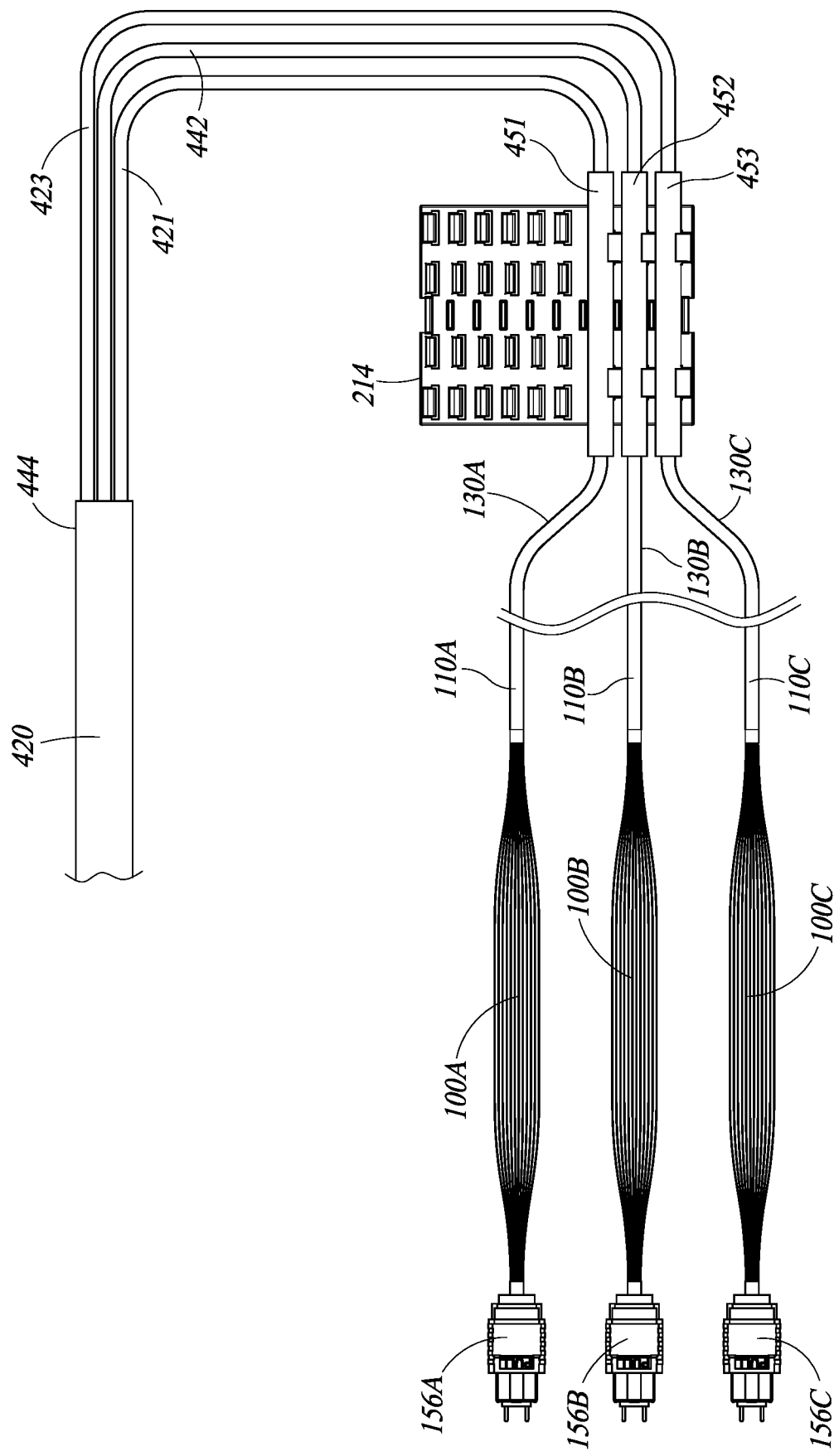
FIG. 17 is a top view of the three fiber optic pigtail assemblies of FIG. 15 spliced with the three ribbons of the third version of the fiber optic cable inside three splice sleeves that are placed in a splice sleeve holder of the second version of the cassette.

Next, the multi-fiber optical connectors 156A-156C are connected to the inwardly facing apertures 411-413 (see FIG. 14), respectively, of the adapters 218D-218F, respectively. Then, the pluralities of optical fibers 110A-110C of each of the assemblies 100A-100C, respectively, are routed as a ribbon underneath the cable management tabs 310-320 (and optionally underneath the cable management tab 322 and/or the cable management tab 324). For example, the pluralities of optical fibers 110A-110C may each be placed under the cable management tabs 310-324 in the following order starting from the adapters 218D-218F: cable management tabs 310, 312, 314, 316, 317, 318, 320, 322, and 324. In the implementation illustrated in FIG. 15, the pluralities of optical fibers 110A-110C are routed in the counter-clockwise direction illustrated by the curved arrow A3. If, as illustrated in FIG. 17, the ribbonized first portions 130A-130C of the assemblies 100A-100C, respectively, are being used to terminate the ribbons 421-423, respectively, of the cable 420, the pluralities of optical fibers 110A-110C of the assemblies 100A-100C may be routed in one complete loop.

Then, referring to FIG. 15, a portion 426 of each of the ribbonized first portions 130A-130C of the pluralities of optical fibers 110A-110C corresponding to the zero mark indicator 290 is marked. After the ribbonized first portions 130A-130C are marked, the pluralities of optical fibers 110A-110C are removed from the cable management tabs 310-324 and set aside while the multi-fiber optical connectors 156A-156C remain mated with the inwardly opening apertures 411-413 (see FIG. 14), respectively.

Figure 16:
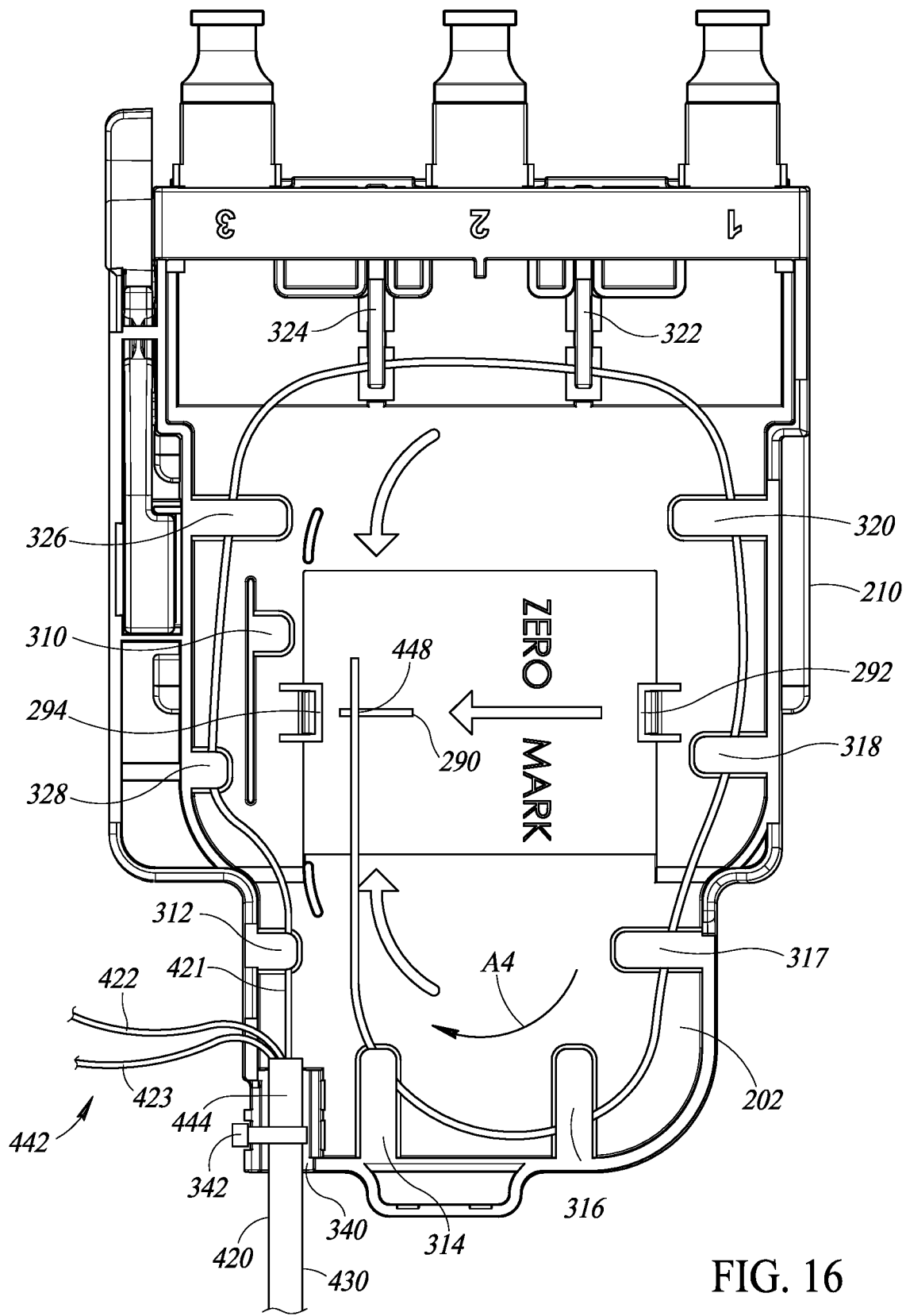
FIG. 16 is a top view of the second version of the cassette with its cover removed and one of three ribbons of a third version of a fiber optic cable routed in the cassette's interior to be marked.

Next, referring to FIG. 16, an end portion of an outer cable jacket 430 of the cable 420 is removed to define an unjacketed portion 442 of the ribbons 421-423 adjacent a jacketed portion 444 in the same manner described above. Then, the unjacketed portion 442 and a portion of the jacketed portion 444 are routed into the interior 202 through the cable opening 340 formed in the base 210.

One or more of the cable ties 342 (or similar structures) may be used to secure the jacketed portion 444 to the base 210.

Then, each of the ribbons 421-423 (in the unjacketed portion 442) is routed one at a time in the clockwise direction illustrated by the curved arrow A4 and positioned underneath the cable management tabs 312-328. For example, each of the ribbons 421-423 may be placed under the cable management tabs 312-328 in the following order starting from the cable opening 340: cable management tabs 312, 328, 326, 324, 322, 320, 318, 317, 316, and 314.

Next, a portion 448 of each of the ribbons 421-423 corresponding to the zero mark indicator 290 is marked (e.g., with a pen). After each of the ribbons 421-423 has been marked, the ribbon (e.g., the ribbon 421) is removed from the cable management tabs 312-328 and set aside. The cable tie(s) 342 may be cut and the cable 420 removed from the base 210.

Referring to FIG. 17, after each of the ribbons 421-423 has been marked, they are cut at or near the location of the marks. For example, the ribbons 421-423 may be cut at the predetermined distance (e.g., 35 mm) beyond their respective marks. Thus, a cut end portion of the ribbons 421-423 may extend outwardly beyond the marks. The user may strip or remove an outer coating from the cut end portion to the mark made on each of the ribbons 421-423 to expose an end section of bare fiber and allow for proper cleaving. The cleaving process may trim the length of the end section of bare fiber of each of the ribbons 421-423 (e.g., to approximately 10 mm). The predetermined distance (e.g., 35 mm) may vary depending upon which cleaver is being used to cleave the ribbons 421-423.

After the ribbonized first portions 130A-130C of the pluralities of optical fibers 110A-110C, respectively, have each been marked, the user installs ribbon splice sleeves 451-453, respectively, and cuts the ribbonized first portions 130A-130C at or near the location of the marks. For example, the ribbonized first portions 130A-130C may each be cut at the predetermined distance (e.g., 35 mm) beyond their respective marks. Thus, a cut end portion of the ribbonized first portions 130A-130C may extend outwardly beyond the marks. The user may strip or remove an outer coating from the cut end portion to the mark made on each of the ribbonized first portions 130A-130C to expose end sections of bare fiber and allow for proper cleaving. The cleaving process may trim the length of each of the end sections (e.g., to approximately 10 mm). As mentioned above, the predetermined distance (e.g., 35 mm) may vary depending upon which cleaver is being used to cleave the ribbonized first portions 130A-130C of the pluralities of optical fibers 110A-110C, respectively.

Then, the user mass splices (e.g., using mass fusion splicing) the ribbonized first portions 130A-130C to the ribbons 421-423, respectively, in order from the ribbon 421 to the ribbon 423 with the splices being positioned inside the ribbon splice sleeves 451-453, respectively. Then, the user places the ribbon splice sleeves 451-453 in the splice sleeve holder 214, which was removed previously from the base 210 (see FIGS. 4-11, 13-16 and 18).

Figure 18:
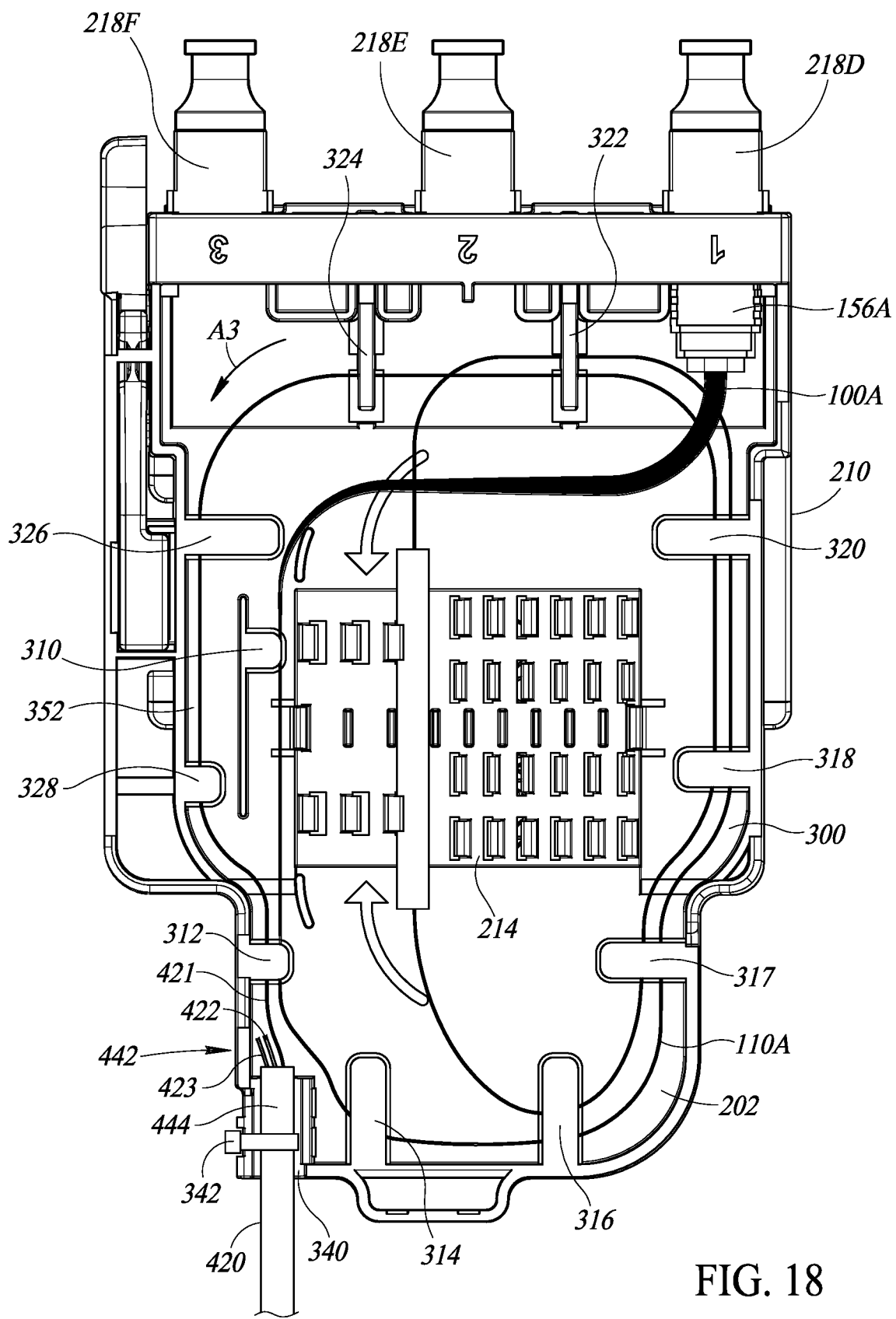
FIG. 18 is a top view of the second version of the cassette with its cover removed and one of the three fiber optic pigtail assemblies of FIG. 15 terminating one of three ribbons of the third version of the fiber optic cable at the cassette.

As mentioned above, referring to FIG. 15, the multi-fiber optical connectors 156A-156C were mated previously with the inwardly facing apertures 411-413 (see FIG. 14), respectively, of the adapters 218D-218F, respectively. Referring to FIG. 18, the user routes each of the pluralities of optical fibers 110A-110C (see FIGS. 15 and 17) underneath the cable management tabs 310-322 (and optionally underneath the cable management tab 324) in the counter-clockwise direction illustrated by the curved arrow A3. For example, the pluralities of optical fibers 110A-110C (see FIGS. 15 and 17) may be placed under the cable management tabs 310-324 in the following order starting from the adapters 218D-218F: cable management tabs 310, 312, 314, 316, 317, 318, 320, 322, and 324. For ease of illustration, FIG. 18 illustrates only the plurality of optical fibers 110A and the ribbon 421 being routed. However, the other pluralities of optical fibers 110B and 110C (see FIGS. 15 and 17) and the ribbons 422 and 423 are routed in a similar manner. The user may rotate the base 210 clockwise while placing the pluralities of optical fibers 110A-110C (see FIGS. 15 and 17) underneath the cable management tabs 310-322 (and optionally the cable management tab 324). After the base 210 has completed one full rotation, the user may install the splice sleeve holder 214 on the bottom portion 300 of the base 210 and place a portion of the pluralities of optical fibers 110A-110C (see FIGS. 15 and 17) under (or on top of) the multi-fiber optical connectors 156A-156C.

The user may continue rotating the base 210 clockwise and position the ribbons 421-423 (see FIG. 17) under the cable management tabs 312-328. For example, the ribbons 421-423 (see FIG. 17) may be placed under the cable management tabs 312-328 in the following order starting from the sleeve holder 214: cable management tabs 314, 316, 317, 318, 320, 322, 324, 326, 328, and 312. The user may place a portion of each of the unjacketed ribbons 421-423 (see FIG. 17) in the outermost channel 352 defined by the outer channel cable management tabs 326 and 328. Then, the jacketed portion 444 is routed out the cable opening 340. Finally, the user secures the jacketed portion 444 to the base 210 using one or more of the cable tie(s) 342 and installs the cover 212 (see FIGS. 4-6 and 13) on the base 210. Referring to FIG. 13, at this point, the second version of the cassette 200 is ready for use and one or more multi-fiber fiber optic connectors (not shown) may be inserted into or received by the outwardly facing apertures 401-403.

Referring to FIG. 12, the loose second portion 132' of the second embodiment of the pigtail assembly 100' allows the ribbonized first portion 130' to be routed within the constrained hollow interior 202 (see FIGS. 5-9, 11, 14, 16, and 18) of the second version of the cassette 200 (see FIG. 13) without exceeding the bend radius of either the individual optical fibers 111'-122' within the loose second portion 132' or the more densely compacted fibers within the ribbonized first portion 130'. Thus, the pigtail assembly 100' avoids possible damage to the optical fibers 111'-122'.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure. Furthermore, it is to be understood that the various embodiments are solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the various embodiments are not limited except as by the appended claims.

What is claimed is:

1. A fiber optic pigtail assembly, comprising:
a ribbonized portion in which first sections of optical fibers are ribbonized, wherein ends of the first sections of the optical fibers are ribbonized and configured to be spliced to a ribbonized fiber optic cable; and a loose portion in which second sections of the optical fibers are not ribbonized, wherein the loose portion transitions to the ribbonized portion at a junction, ends of the second sections of the optical fibers are separated and terminated by respective connectors, the second sections of the optical fibers have different lengths, at least portions of the second sections of the optical fibers traverse through tubes that extend from the respective connectors partway toward the ribbonized portion, distances between the junction and the tubes along the optical fibers are equal or substantially equal, and the fiber optic pigtail assembly is provided as a pre-made assembly.

2. The fiber optic pigtail assembly of claim 1, further comprising a demarcation indicator located at or near the junction at which the ribbonized portion transitions to the loose portion, wherein cutting the fiber optic pigtail at the demarcation indicator separates the ribbonized portion from the loose portion.

3. The fiber optic pigtail assembly of claim 2, wherein the ends of the second sections of the optical fibers are first ends, and the cutting of the fiber optic pigtail at the demarcation indicator yields second ends of the second sections of the optical fibers that are configured to splice to respective individual optical fibers of a fiber optic cable.

4. The fiber optic pigtail assembly of claim 2, wherein the demarcation indicator comprises heat shrink tape.

5. The fiber optic pigtail assembly of claim 1, wherein the connectors are configured to insert into inwardly facing ports of one or more adapters of a fiber optic cassette.

6. The fiber optic pigtail assembly of claim 5, wherein the connectors create an optical connection between the optical fibers and other optical fibers inserted into outwardly facing ports of the one or more adapters.

7. The fiber optic pigtail assembly of claim 1, wherein the tubes are color-coded according to the different lengths.

8. A system, comprising:

optical fibers that are joined in a pigtail assembly comprising a first section in which the optical fibers are ribbonized and a second section, adjacent to the first section, in which the optical fibers are separated from one another, wherein ends of the optical fibers in the first section are ribbonized and are configured to be spliced to a ribbonized cable, and the optical fibers within the second section are sized to have different lengths;

connectors that terminate ends of the optical fibers in the second section; and tubes that encompass respective portions of the optical fibers within the second section, the respective portions extending from the connectors partway toward the first section, wherein the first section transitions to the second section at a junction, distances between the junction and the tubes along the optical fibers are equal or substantially equal, and the system is provided as a pre-made assembly.

9. The system of claim 8, further comprising a demarcation indicator that marks a location along the pigtail assembly that, when severed, separates the first section from the second section.

10. The system of claim 9, wherein severing the pigtail assembly at or near the location marked by the demarcation indicator yields a separated second section comprising separated optical fibers, and the separated optical fibers comprise the ends terminated by the connectors and opposite ends configured to be spliced to respective individual optical fibers of a fiber optic cable.

11. The system of claim 9, wherein the demarcation indicator is shrink tape.

12. The system of claim 8, wherein an end of the first section of the pigtail assembly is configured to be spliced to a ribbonized fiber optic cable.

13. The system of claim 8, wherein the connectors are configured to be plugged into inwardly facing ports of one or more adapters of a fiber optic cassette.

14. The system of claim 8, wherein the tubes are color-coded according to the different lengths.

15. A fiber optic pigtail assembly, comprising:

optical fibers that are ribbonized along a first section of the pigtail assembly and non-ribbonized along a second section of the pigtail assembly adjacent to the first section, wherein ends of ribbonized sections of the optical fibers in the first section are ribbonized and configured to be spliced to a ribbonized fiber optic cable, and non-ribbonized sections of the optical fibers comprising the second section have different lengths;

connectors that terminate ends of the non-ribbonized sections of the optical fibers; and tubes that encompass respective portions of the optical fibers within the second section, the respective portions extending from the connectors partway toward the first section, wherein the first section transitions to the second section at a junction, distances between the junction and the tubes along the optical fibers are equal or substantially equal, and the fiber optic pigtail assembly is provided as a pre-assembled kit.

16. The fiber optic pigtail assembly of claim 15, further comprising demarcation structure located at a position along the pigtail assembly, wherein the position corresponds to a location that, when cut, separates the second section comprising non-ribbonized optical fibers from the first section comprising ribbonized optical fibers.

17. The fiber optic pigtail assembly of claim 16, wherein the ends of the non-ribbonized sections of the optical fibers are first ends, and cutting of the position corresponding to the demarcation structure yields second ends of the non-ribbonized sections of the optical fibers that are configured to splice to respective individual optical fibers of a fiber optic cable.

18. The fiber optic pigtail assembly of claim 16, wherein the demarcation indicator comprises heat shrink tape.

19. The fiber optic pigtail assembly of claim 15, wherein the connectors are configured to insert into inwardly facing ports of one or more adapters of a fiber optic cassette.

20. The fiber optic pigtail assembly of claim 15, wherein the tubes are color-coded according to the different lengths.

* * * * *